(12) United States Patent
Schmitt

(10) Patent No.: US 11,788,927 B2
(45) Date of Patent: Oct. 17, 2023

(54) EVALUATION OF PREFORMS WITH NON-STEP-INDEX REFRACTIVE-INDEX-PROFILE (RIP)

(71) Applicant: Heraeus Quartz North America LLC, Buford, GA (US)

(72) Inventor: Maximilian Schmitt, Duluth, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 226 days.

(21) Appl. No.: 17/186,907

(22) Filed: Feb. 26, 2021

(65) Prior Publication Data
US 2022/0276124 A1    Sep. 1, 2022

(51) Int. Cl.
*G01M 11/02* (2006.01)
*G01M 11/00* (2006.01)

(52) U.S. Cl.
CPC ........ *G01M 11/0228* (2013.01); *G01M 11/30* (2013.01)

(58) Field of Classification Search
CPC . G01N 21/41; G01N 21/412; G01M 11/0228; G01M 11/30; G01M 11/37
USPC ........................................ 356/73.1, 127–128
See application file for complete search history.

(56) References Cited

U.S. PATENT DOCUMENTS

| | | | |
|---|---|---|---|
| 3,636,360 A | 1/1972 | Oishi et al. | |
| 3,751,672 A | 8/1973 | Michel et al. | |
| 4,181,433 A | 1/1980 | Marcuse | |
| 4,227,806 A | 10/1980 | Watkins | |
| 4,441,811 A | 4/1984 | Melezoglu et al. | |
| 4,492,463 A | 1/1985 | Marcuse et al. | |
| 4,515,475 A | 5/1985 | Payne et al. | |
| 4,519,704 A | 5/1985 | Mansfield et al. | |
| 4,726,677 A * | 2/1988 | Glantschnig | G01N 21/412 356/73.1 |
| 4,744,654 A * | 5/1988 | Jinno | G01N 21/412 356/73.1 |

(Continued)

OTHER PUBLICATIONS

Extended Search Report dated May 12, 2017 in EP Application No. 16195864.0.

(Continued)

*Primary Examiner* — Isiaka O Akanbi
(74) *Attorney, Agent, or Firm* — Panitch Schwarze Belisario & Nadel LLP

(57) ABSTRACT

A method for determining the refractive index profile of a preform when the RIP is not substantially step-index like. (a) The preform deflection function is measured and transformed into a measured RIP. (b) A RI level and radius are assumed for the preform layer being evaluated and a compensation level RIP is calculated. (c) A theoretical deflection function is generated corresponding to the assumed RI level and radius and the generated data are transformed into a fitting RIP. (d) The fitting RIP is compared to the measured RIP and the comparison is evaluated against a predetermined accuracy level for the preform layer being evaluated. (e) Steps (b) and (c) are repeated iteratively until the predetermined accuracy level has been achieved. Steps (b) through (e) are repeated for each preform layer that needs to be compensated. Finally, a measurement artifact compensated refractive index profile is calculated for the preform.

14 Claims, 11 Drawing Sheets

(56) References Cited

U.S. PATENT DOCUMENTS

| | | | |
|---|---|---|---|
| 4,934,818 A * | 6/1990 | Glantschnig | G01N 21/412 |
| | | | 356/73.1 |
| 5,078,488 A | 1/1992 | Yamaguchi et al. | |
| 5,118,954 A | 6/1992 | Grosso | |
| 5,365,329 A * | 11/1994 | Svendsen | G01N 21/412 |
| | | | 356/73.1 |
| 5,396,323 A | 3/1995 | Abbott, III et al. | |
| 5,450,192 A | 9/1995 | Nolf et al. | |
| 5,844,669 A | 12/1998 | Wang et al. | |
| 6,131,414 A | 10/2000 | Shimizu et al. | |
| 6,538,755 B1 | 3/2003 | Propst | |
| 6,611,321 B1 | 8/2003 | Sasaki | |
| 6,919,954 B2 | 7/2005 | Sasaki et al. | |
| 7,078,719 B2 | 7/2006 | Pirinoli | |
| 7,317,856 B2 | 1/2008 | Hirano et al. | |
| 7,880,898 B2 | 2/2011 | Jeannot et al. | |
| 8,013,985 B2 | 9/2011 | Cook | |
| 8,322,166 B2 | 12/2012 | Bookbinder et al. | |
| 8,786,863 B2 | 7/2014 | Kato | |
| 9,481,599 B2 | 11/2016 | Bickham et al. | |
| 9,952,033 B2 | 4/2018 | Martini et al. | |
| 9,989,458 B2 | 6/2018 | Cook et al. | |
| 10,508,973 B2 | 12/2019 | Schmitt et al. | |
| 2004/0257506 A1 | 12/2004 | Tashiro et al. | |
| 2005/0057746 A1 | 3/2005 | Takahashi et al. | |
| 2005/0126227 A1 | 6/2005 | Collaro | |
| 2008/0285926 A1 | 11/2008 | Sahu | |
| 2009/0147268 A1 | 6/2009 | De Groot | |
| 2010/0149639 A1 | 6/2010 | Kim | |
| 2010/0245805 A1 * | 9/2010 | Cook | G01N 21/412 |
| | | | 356/128 |
| 2012/0263793 A1 | 10/2012 | Vitaliano | |
| 2013/0029038 A1 * | 1/2013 | Bickham | C03B 37/01413 |
| | | | 427/163.2 |
| 2013/0070462 A1 | 3/2013 | Jin et al. | |
| 2013/0155394 A1 | 6/2013 | Saito et al. | |
| 2015/0233703 A1 | 8/2015 | Martini et al. | |
| 2015/0332451 A1 | 11/2015 | Amzaleg et al. | |
| 2016/0123873 A1 * | 5/2016 | Cook | G01M 11/37 |
| | | | 356/73.1 |
| 2016/0141154 A1 | 5/2016 | Kamata et al. | |
| 2018/0113052 A1 * | 4/2018 | Schmitt | G01M 11/35 |

OTHER PUBLICATIONS

Fleming et al., "Nondestructive Measurement For Arbitrary RIP Distribution Of Optical Fiber Preforms," Journal of Lightwave Technology, vol. 22, No. 2, pp. 478-486 (2004).

Hutsel & Gaylord, "Concurrent Three-Dimensional Characterization Of The Refractive-Index And Risidual-Stress Distributions In Optical Fibers," Applied Optics, vol. 51, No. 22, pp. 5442-5452 (2012).

Wikipedia-Linear regression, 2021.

Glantschnig, "Index Profile Reconstruction Of Figer Preforms Form Data Containing A Surface Refraction Component "Applied Optics, vol. 29, No. 19, pp. 2899-2907 (Jul. 1, 1990).

* cited by examiner

EVALUATION OF PREFORMS WITH NON-STEP-INDEX REFRACTIVE-INDEX-PROFILE (RIP)

FIELD

The present disclosure relates generally to refractive index measurements and, more particularly, to methods of measuring the refractive index profile of a transparent cylindrical object such as a fiber preform.

BACKGROUND

Transparent cylindrical objects, such as fiber preforms, optical fibers, light pipes, light tubes, and the like are used in a variety of optical applications. In many instances, it is desirable to know the refractive index profile (RIP) of such objects. For example, optical fibers are formed by heating a fiber preform and drawing the molten end into a thin glass thread. The RIP of the preform defines the RIP of the resulting optical fiber, which in turn determines the waveguiding properties of the optical fiber. It is thus important to be able to accurately measure the RIP of the fiber preform.

Various methods exist for determining a radial RIP of a cylindrical optical object, particularly a preform for an optical fiber. The cylinder optical object often has a cylinder longitudinal axis around which at least one layer k with a layer radius $r_k$ and with a layer refractive index $n_k$ extends radially symmetrically (although, of course, many objects having a non-symmetrical RIP also exist). A deflection angle distribution $\psi(y)$ is measured and the RIP is reconstructed from the deflection angle distribution. The raidal RIP is also known as the radial refractive index distribution, represented by the symbol n(r).

Unfortunately, the refractive index distribution cannot be measured directly. The refractive index distribution is normally determined indirectly as a deflection or interference of a light beam which is transmitted through a volume region of the optical element, the stepwise transmission being also called "scanning." The spatial refractive index distribution in the optical element can be inferred from the interference or the deflection of the exiting light beam (exit beam) based on the beam direction at the beam entrance point (entry beam). The family of the deflection angles $\psi$ measured during scanning of the light beam in a direction transverse to the cylinder longitudinal axis (in the y-direction) forms the deflection angle distribution $\psi(y)$.

For a better view and illustration, the geometric relationships are schematically shown in FIG. 1A. Depicted is an object with a homogeneous refractive index $n_1$ surrounded by an index adjustment fluid with a refractive index $n_0$ such that $n_0 < n_1$. The radius of the object is $r_1$. The deflection angle $\psi$ is defined as the angle between the exit beam and the entry beam, and y is defined as the distance between the cylinder longitudinal axis and the entry point of the entry beam. When scanning the object, the beam is refracted as soon as it contacts the object and is directed toward the center of the object. The shortest distance of the beam to the center of the object is given by the radius r*, which appears in the formulation of the inverse Abel transformation later on.

For radially symmetric objects with a step index distribution of the refractive index, the deflection angle distribution $\psi(y)$ can be described mathematically with reference to the following Equation (1):

$$\psi_m(y) = \begin{cases} 2 \cdot \sum_{j=1}^{m} \sum_{k=1}^{j} \left[ \arcsin\left(\frac{y}{r_k} \cdot \frac{n_0}{n_{k-1}}\right) - \arcsin\left(\frac{y}{r_k} \cdot \frac{n_0}{n_k}\right) \right], & \text{for } r_{j+1} \cdot \frac{n_{j+1}}{n_0}, r_{j+1} \cdot \frac{n_j}{n_0} \leq |y| < r_j \cdot \frac{n_j}{n_0} \\ 2 \cdot \sum_{j=1}^{m} \sum_{k=1}^{j} \left[ \arcsin\left(\frac{y}{r_k} \cdot \frac{n_0}{n_{k-1}}\right) - \arcsin\left(\frac{y}{r_k} \cdot \frac{n_0}{n_k}\right) \right] + 2 \cdot \arccos\left(\frac{y}{r_j} \cdot \frac{n_0}{n_{j-1}}\right), & \text{for } r_{j+1} \cdot \frac{n_{j+1}}{n_0} \leq |y| < r_{j+1} \cdot \frac{n_j}{n_0} \\ 0 & \text{for } |y| \geq r_1 \end{cases}$$

In Equation (1), m is the number of the layers of the object, $n_0$ is the refractive index of the surrounding medium, $n_k$ is the refractive index of the k-th layer, and $r_k$ is the radius of the k-th layer. A known mathematical method for calculating the refractive index profile from the deflection angle distribution based on measurement data according to Equation (1) is based on the well-known "Abel transform":

$$n[r(y)] = n_0 \cdot \exp\left(\frac{1}{\pi} \cdot \int_y^R \frac{\psi(r)dr}{\sqrt{r^2 - y^2}}\right)$$

where r is the shortest distance from the cylinder longitudinal axis of the object to the beam path, namely, $$r(y) = y \cdot \exp\left(-\frac{1}{\pi} \cdot \int_y^R \frac{\psi(r)dr}{\sqrt{r^2 - y^2}}\right)$$

and R is the reference point for the refractive index distribution, namely the radial position of the reference refractive index (atmosphere, index adjustment fluid, or a reference glass plate surrounding the object). By applying the partial derivative of $\psi$ from the location $\Delta t$ the formulation becomes the shape of the inverse Abel transformation well-known in mathematics. In principle, the Abel transformation can be applied to any kind of deflection angle distribution, not just the ideal of a step index-like distribution as reflected in Equation (1).

U.S. Pat. No. 4,227,806 describes a method for non-destructively determining parameters of an optical fiber preform. The preform is scanned by a laser beam entering transversely into the core-cladding structure, and the deflection angle of the exiting beam is measured and subsequently compared to theoretical or empirical deflection angle distributions of preforms whose refractive index distribution is known. During measurement, the preform is positioned in a bath containing an index adjustment fluid so as to prevent the deflection angle from becoming too large.

U.S. Pat. No. 4,441,811 describes a method and an apparatus for determining the refractive index distribution of a cylindrical, transparent optical preform. In this case, too, the preform which is inserted in an index adjustment fluid is scanned by a transversely entering light beam that extends perpendicular to the optical axis. The light beam is deflected by the glass of the preform and imaged with an optical device onto a positionable detector. The refractive index profile is calculated from the deflection angle distribution using numerical integration. Other preform parameters, such as preform diameter, core diameter, eccentricity, and CCDR value (cladding-to-core diameter ratio) can also be determined from the deflection angle distribution.

Methods for the reconstruction of the RIP from the transversely measured deflection angle distribution by using the Abel transform can also be found in U.S. Pat. Nos. 4,744,654, 5,078,488, 4,515,475. The two following technical articles also describe such methods: Michael R. Hutsel and Thomas K. Gaylord, "Concurrent three-dimensional characterization of the refractive-index and residual-stress distributions in optical fibers," Applied Optics, Optical Society Of America, Washington, D.C.; Vol. 51, No. 22, pages 5442-52 (Aug. 1, 2012) (ISSN: 0003-6935, DOI: 10.1364/A0.51.005442), and S. Fleming et al., "Nondestructive Measurement for Arbitrary RIP Distribution of Optical Fiber Preforms," Journal Of Lightwave Technology, IEEE Service Center, New York, N.Y., Vol. 22, No. 2, pages 478-86 (Feb. 1, 2004) (ISSN: 0733-8724, DOI: 10.1109/JLT.2004.824464).

The simple reconstruction of the RIP or refractive index profile n(r) from the transversely measured deflection angle distribution using the Abel transform does not lead, however, to negligible differences with respect to the real RIP. The reason for this is a known measurement artifact that occurs in refractive index discontinuities on boundaries between the transparent object and the environment or on the boundary between radial refractive index steps. Measurements taken on the boundaries of refractive index jumps from a low to a high refractive index (when viewed from the outside to the inside) in a near-boundary volume region of the optical object lead to a region that can in principle not be measured. Typical differences and errors of the reconstructed RIP, for instance, of step index profiles are roundings of the profile and step heights that are too small. The publication by Werner J. Glantschnig, "Index profile reconstruction of fiber preforms form data containing a surface refraction component," Applied Optics, Vol. 29, No. 19, pages 2899-2907 (Jul. 1, 1990) ("the Glantschnig publication," which is incorporated by reference in this document), is one publication that addresses the problems posed by the non-measurable region. Glantschnig suggests that, by way of interpolation based on the inner three measuring points of the deflection angle distribution directly before the discontinuity, the actually missing deflection angles are inferred in the non-measureable region.

The interpolation based on three measuring points does not always produce good results. Thus, some of the methods of measuring a RIP cannot provide an accurate measurement of the RIP of a simple homogeneous rod. One reason for this shortcoming is that there is a refractive index discontinuity at the boundary, or edge, of the rod that results in a surface refraction component to the measurement. The Glantschnig publication explains the reasons why a refractive index discontinuity is not accurately reconstructed from the deflection function data. Although the Glantschnig publication proposes a method for measuring the RIP, it requires measuring the deflection angle precisely at the edge of the object, which is difficult to the point of impracticality.

To solve these problems, U.S. Pat. No. 8,013,985 issued to Corning Incorporated (which is incorporated by reference in this document) suggests a modification of this reconstruction method in that, for the measurement of the RIP of a transparent cylindrical object such as a fiber preform, a beam deflection angle function is measured and the RIP is reconstructed from the measured data on the basis of the paraxial ray theory mathematically. In the measurement, the fiber preform to be measured is arranged between a laser and a transform lens. The preform has a central axis and a cylinder surface that define a preform radius R. The entry beam impinging on the cylinder surface at height x is deflected in the preform and exits again as an exit beam at another angle, which is detected by a photodetector and processed by a controller. The deflection angle is defined as the angle between the exit beam and the entry beam and is changed by varying the laser beam height x, and the deflection angle distribution is measured. An estimated RIP that is representative of the real RIP is adapted by a numerical model to the measured deflection angle distribution.

To this end, a symmetry correlation is completed on the measured deflection function to define a center coordinate. The measured deflection function is split into two halves about the center coordinate, and a refractive index half-profile is calculated for each of the two halves to obtain a resulting estimated index profile for each half. The relevant parameters for the RIP calculation are the preform radius R and the refractive index of the preform. A target angle distribution $\psi_t$ is iteratively adapted to the measured deflection function, with measurement points close to a boundary (refractive index discontinuity) being omitted within or on the edge of the preform. This method of the arithmetical iterative adaptation of mathematical functions can be called "fitting."

According to U.S. Pat. No. 8,013,985, fitting is conducted in that the above Equation (1) (however without consideration of the arccos portion indicated in the second line of the equation) has inserted into the Equation yet unknown parameters of the RIP, namely a value for the preform radius R (or for the radius of the refractive index discontinuity), as well as yet unknown refractive index values, wherein the yet unknown parameters are varied such that the target angle distribution $\psi_t$ obtained best matches the measured deflection angle distribution $\psi_m$. The target angle distribution is thus adapted (fitted) with the yet unknown parameters to the measured deflection angle distribution.

On the basis of the thus adapted, simulated target angle distribution, a reconstructed refractive index profile is derived. This profile extends up to the reconstructed preform radius R* which is greater than the radius of the inner object region. For cylindrical objects whose RIP has at least one discontinuity, the method is applied to the various object regions which are respectively defined by the discontinuity.

In this method, a simulated target angle distribution $\psi_t$ is adapted to the measured deflection angle distribution $\psi_m$ by fitting yet unknown parameters, and a radial refractive index distribution which can extend up to the boundary of a further externally located discontinuity of the refractive index profile is derived from the simulated target angle distribution.

The detection of a complete RIP of an optical object having several layers radially separated by a refractive index discontinuity therefore requires a successive measurement, calculation, and estimation of the layers defined by the respective discontinuity from the outside to the inside.

Systematic and numerical errors may result in the fitting of the simulated target angle distribution. In addition, it has been found that the comparison of deflection angle distributions, namely a simulated one and a measured one, is not very illustrative and requires a high degree of expertise for determining whether and optionally how a fitting is optimal, or whether and optionally which value requires a post-correction or further variation.

U.S. Pat. No. 10,508,973, issued to the assignee of the present application (Heraeus Quarzglas GmbH & Co. KG of Hanau, Germany) and incorporated by reference in this document, teaches a method for determining the refractive index profile of a cylindrical optical object, particularly a preform for an optical fiber. The method involves: (a) preparing the measured deflection angle distribution, including an extreme value determination of the deflection angle distribution, to obtain a prepared deflection angle distribution; (b) transforming the prepared deflection angle distribution into a prepared refractive index profile; (c) evaluating the prepared refractive index profile for the fixation of orientation values for the layer radius and for the layer refractive index of a hypothetical refractive index profile; (d) generating a simulated deflection angle distribution on the basis of the hypothetical refractive index profile with the orientation values, and transforming the deflection angle distribution into a simulated refractive index profile; (e) fitting the simulated refractive index profile to the prepared refractive index profile by iterative adaptation of parameters to obtain a fitted, simulated refractive index profile which is defined by adapted parameters; and (f) obtaining the refractive index profile as the hypothetical refractive index profile with the adapted parameters. The method represents the state-of-the-art with respect to determining the RIP when the RIP is substantially or completely step-index like.

A need remains, however, for a method for determining the RIP of a cylindrical transparent object (typically, although not necessarily, with a radially symmetric or approximately radially symmetric refractive index distribution) when the RIP is not substantially or completely step-index like. Of course, the method must also be improved in terms of plausibility, accuracy, reliability, and reproducibility. A related need is for a method that improves preform assembly and meets the demands of preform customers, especially for preforms of increasingly more complex designs.

SUMMARY

To meet these and other needs, and in view of its purposes, the present disclosure provides a method for determining the refractive index profile of an object such as a preform especially when the RIP is not substantially step-index like. The method includes the following steps. (a) A cylindrical optical object is provided which has a cylinder longitudinal axis around which at least one layer k with a layer radius $r_k$ and with a layer refractive index $n_k$ extends radially symmetrically wherein the at least one layer is not substantially step-index. (b) Next, the deflection function of the object is measured and the measured data are transformed into a measured refractive index profile. (c) A refractive index level and radius are assumed for the layer (initially, the outer layer) of the object being evaluated and a compensation level refractive index profile is calculated. (d) A theoretical deflection function is generated corresponding to the assumed refractive index level and radius and the generated data are transformed into a fitting refractive index profile. (e) The fitting refractive index profile is compared to the measured refractive index profile and the comparison is evaluated against a predetermined accuracy level for the layer of the object being evaluated. (f) Steps (c) and (d) are repeated iteratively until the predetermined accuracy level has been achieved. (g) A determination is made about whether the object has another layer to compensate. (h) Steps (c) through (f) are repeated for each layer of the object until no further layers of the object remain to be evaluated and compensated. (i) Finally, a measurement artifact compensated refractive index profile is calculated for the object.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Figure 2:
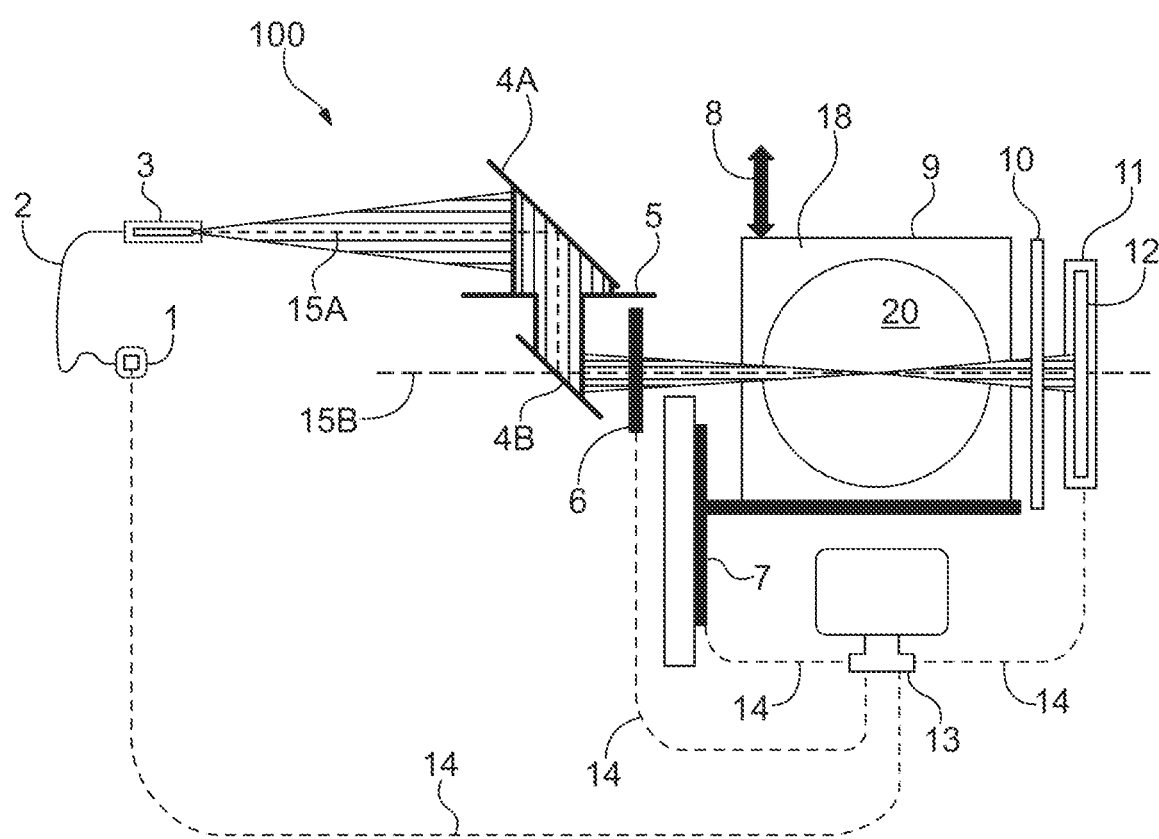
FIG. 2 is a schematic illustration of a deflection function measurement system.

The description of the present methods follows with reference to a transparent cylindrical object in the form of a fiber preform. It will be understood by a person skilled in the art, however, that the methods described can be applied generally to any cylindrical object having a refractive index at a given wavelength of radiation, where the corresponding deflection angle distribution can be measured via transverse transmission of the radiation of a wavelength and a target deflection angle distribution function exists that can be expressed as a function which can be fitted to the measured data. Referring now to the drawing, in which like reference numbers refer to like elements throughout the various figures that comprise the drawing, FIG. 2 is a schematic diagram illustrating an example embodiment of a basic deflection angle distribution function measurement system 100 that can be used to establish the measured deflection angle distribution function.

The system 100 has a first optical axis 15A, a second optical axis 15B, and a third optical axis (not shown) between a pair of off-axis mirrors 4A, 4B. A laser source such as a laser diode 1 generates a laser beam (or "light beam") and provides the laser beam to a single-mode optical fiber 2 which delivers the laser beam to a beam conditioner 3. (In fiber-optic communication, a single-mode optical fiber is an optical fiber designed to carry only a single mode of light: the transverse mode. The standard G.652 defines the most widely used form of single-mode optical fiber.) The beam conditioner 3 is aligned along the first optical axis 15A and alters the properties of the laser beam. The beam emitted by the beam conditioner 3 travels along the first optical axis 15A and engages an off-axis parabolic reflector having the pair of mirrors 4A, 4B and an aperture (or "pin hole") 5. The first mirror 4A creates parallel beams which pass through the aperture 5; the second mirror 4B focuses those beams along the second optical axis 15B.

The focused beams that deflect from the second mirror 4B of the off-axis parabolic reflector pass through an optical shutter 6 and enter a measuring cell 9. During operation, the shutter 6 remains in a closed position and then opens when a pulse control signal is applied. As long as the control voltage to the shutter 6 remains high, the shutter 6 stays open. As soon as the voltage goes low, however, the shutter 6 closes, providing inherent "fail-safe" operation, i.e., security.

The measuring cell 9 has opposite sides that are planar and at right-angles to the second optical axis 15B. Arranged in the measuring cell 9 is a transparent cylindrical object 20 having a homogeneous or a stepped RIP to be measured, typically in the form of a fiber preform having a core with a higher refractive index surrounded by at least one cladding layer with a lower refractive index. Surrounding the object 20 in the measuring cell 9 is an index adjustment fluid 18. In an example embodiment, the index adjustment fluid 18 is an oil with a refractive index that is close to, but not the same as, the refractive index of the measurement cell 9.

The laser beam enters the measuring cell 9 and is first incident on the object 20 at a first edge of the object 20 and undergoes a first refraction. The first-refracted laser beam then travels through the object 20 and exits the object 20 on the opposite edge, where it undergoes a second refraction and exits the object 20. The deflection angle, identified by the Greek letter $\psi$ (psi), is defined by the path of the exit laser beam relative to the direction of the incident laser beam. The exit laser beam then passes through a filter (e.g., an infrared long pass filter) 10 and is detected by a photodetector unit. The filter 10 helps to preclude environmental light from adversely impacting measurements. A suitable photodetector unit includes a line scan camera 11 having an optically active sensor 12. The photodetector unit then sends a corresponding detector signal to a controller 13 for processing.

The measuring cell 9 is mounted on a linear stage 7 configured both to support the measuring cell 9 and to move the measuring cell 9 in movement directions 8 (e.g., up and down as shown in FIG. 2). By performing measurements of the deflection angle over a range of laser beam heights relative to the central horizontal axis of the measuring cell 9 and the object 20 in the measuring cell 9, the corresponding detector signals received and processed by the controller 13 create the measured deflection angle as described in greater detail below. In other words, the movement of the linear stage 7 allows for the laser beam height to be varied relative to measurement cell 9 and the object 20 so that the measured deflection function includes a range of radii of the object 20.

Although in the embodiment illustrated in FIG. 2 the object 20 in the measuring cell 9 is moved (e.g., scanned), in another embodiment other components (such as the laser diode 1 and the photodetector unit) can all be simultaneously moved (e.g., scanned) relative to the object 20 (which is held stationary) so that the laser beam height can be varied in order to send the laser beam through different parts of the object 20.

The controller 13 is, for example, a computer that includes a processor unit (e.g., a CPU), a memory unit, and support circuitry all operably interconnected. The processor may be or include any form of a general-purpose computer processor that can be used in an industrial setting. The memory unit includes a computer-readable medium capable of storing instructions (e.g., software) that direct the processor to carry out the methods as described in detail below. The memory unit may be, for example, random-access memory, read-only memory, floppy or hard disk drive, or other form of digital storage. In an example embodiment, the instructions stored in the memory unit are in the form of software that, when executed by the processor, transform the processor into a specific-purpose processor that controls (i.e., directs or causes) the system 100 to carry out one or more of the methods described below. The support circuitry is operably (e.g., electrically) coupled to the processor and may include cache, clock circuits, input/output sub-systems, power supplies, control circuits, and the like.

The laser diode 1, the shutter 6, the linear stage 7, and the line scan camera 11 are each configured to send signals and data to, and receive signals and data from, the controller 13 along a plurality of data connections 14. The data connections 14 may be wired or wireless; any conventional data connections 14 as would be known to an artisan are suitable.

Many other deflection function measurement systems similar to those described above can be used to obtain the deflection function. Regardless of the system used, a number of methods for determining the RIP of the cylindrical optical object 20 are possible.

In one method, a prepared deflection angle distribution $\psi'(y)$ is produced in a first step from the measured deflection angle distribution $\psi(y)$. For this purpose, the measured deflection angle distribution $\psi(y)$ is subjected to an analysis and determination of extreme values. Such extreme values always occur in the region of a refractive index jump, for instance on an inner boundary or on the cylinder surface of the optical object 20. For the sake of simplicity, the following explanations will refer to an optical preform with a step index profile that has at least two layers and thus one or more refractive index jumps.

The deflection angle distribution of radially symmetric objects has at least two extreme values that are caused by the refractive index jump on one and the same layer k. In the determination of the extreme values, the positions of the extreme values $y_{k,max}$ of the measured deflection angle distribution are determined. The positions are already approximately the edges on both sides (numerically defined by the radius of the corresponding layer) where the refractive index jump occurs. This determination of the extreme values is called "edge detection."

The measurement data of the deflection angle distribution should refer to a Cartesian coordinate system (X, Y, Z). Such a coordinate system specifies each point uniquely in three-dimensional space by three Cartesian numerical coordinates, which are the signed distances to the point from three, fixed, mutually perpendicular directed lines, measured in the same unit of length. Each reference line is called a coordinate axis or just an axis of the system, and the point where they meet is its origin, usually at ordered triplet (0, 0, 0). The coordinates can also be defined as the positions of the perpendicular projections of the point onto the three axes, expressed as signed distances from the origin.

The measurement data of the deflection angle distribution are indicated as dependent on the y-axis of the Cartesian coordinate system, whereas the radii of the layers normally refer to a different coordinate system (radial system) and are indicated dependent on the radius r. In the case of small refractive index differences and a weak refraction, the difference may be so small that a distinction is often not made between y- and r-values, which is called the "approximation method," "straight-line approximation," or "no-refraction-approximation" in the literature.

In edge detection, the risk of erroneously assuming an edge because of outliers or measurement noise should be avoided as much as possible. It has been found that a procedure in which the measured deflection angle distribution is smoothed by way of spline functions using several different smoothing parameters is particularly well suited for this purpose. The spline functions are several composed polynomials of a higher order. By iterative application of weaker smoothing parameters, the respective extrema are gradually shifted in each iteration towards the actual extrema.

Thus, in edge detection, an innermost right extreme value $y_{k,right}$ and an innermost left extreme value $y_{k,left}$ are preferably determined. As discussed above, these values approximately correspond to the corresponding edges of the k-th layer of the RIP. This is, for instance, the outer edge of the core or the outer edge of a cladding layer (noting that the refractive indices are increasing from the outside to the inside). The right and left edges determined in this way are particularly well suited to define the actual center point of the object 20.

Moreover, the preparation of the measured deflection angle distribution preferably comprises an adjustment (fine-tuning) in which the origin of the deflection angle distribution is adjusted.

The coordinate origin of the deflection angle distribution in the Cartesian coordinate system through which (at y=0) the cylinder longitudinal axis of the object 20 is to extend is called the origin. A shift along the y-axis may occur because, in the measurement of the deflection angle distribution using the system 100, the y-axis is solely defined through the geometry of the measuring cell 9. The center of the measuring cell 9 does not automatically correspond, however, to the longitudinal axis of the object 20. Therefore, the adjustment of the origin of the deflection angle distribution includes, for example, a shift in the direction of the y-axis of the coordinate system into the middle between the innermost right extreme value $y_{k,right}$ and the innermost left extreme value $y_{k,left}$.

Moreover, the whole angle distribution may comprise an offset from the coordinate origin in the form of a shift in the direction of the vertical axis (this is the ψ-axis in the coordinate system of the deflection angle distribution). To eliminate the offset, the deflection angle distribution is shifted by the distance determined in this way in the direction of a ψ axis of the coordinate system.

In general, a precise (correct) definition or determination of the origin of ψ is very important to achieve an accurately calculated RIP and therefore all following steps. Unfortunately, it is not trivial to determine ψ=0° (no deflection). Differences in the range of just 0.01° have a large impact on the calculated RIP. Defining this origin just by the geometry of the setup is not sufficient. In practice, several methods are available to fine tune or determine the deflection origin, where ψ=0°. Unfortunately, some of these methods depend on the sample itself and are not always applicable.

Figure 5:
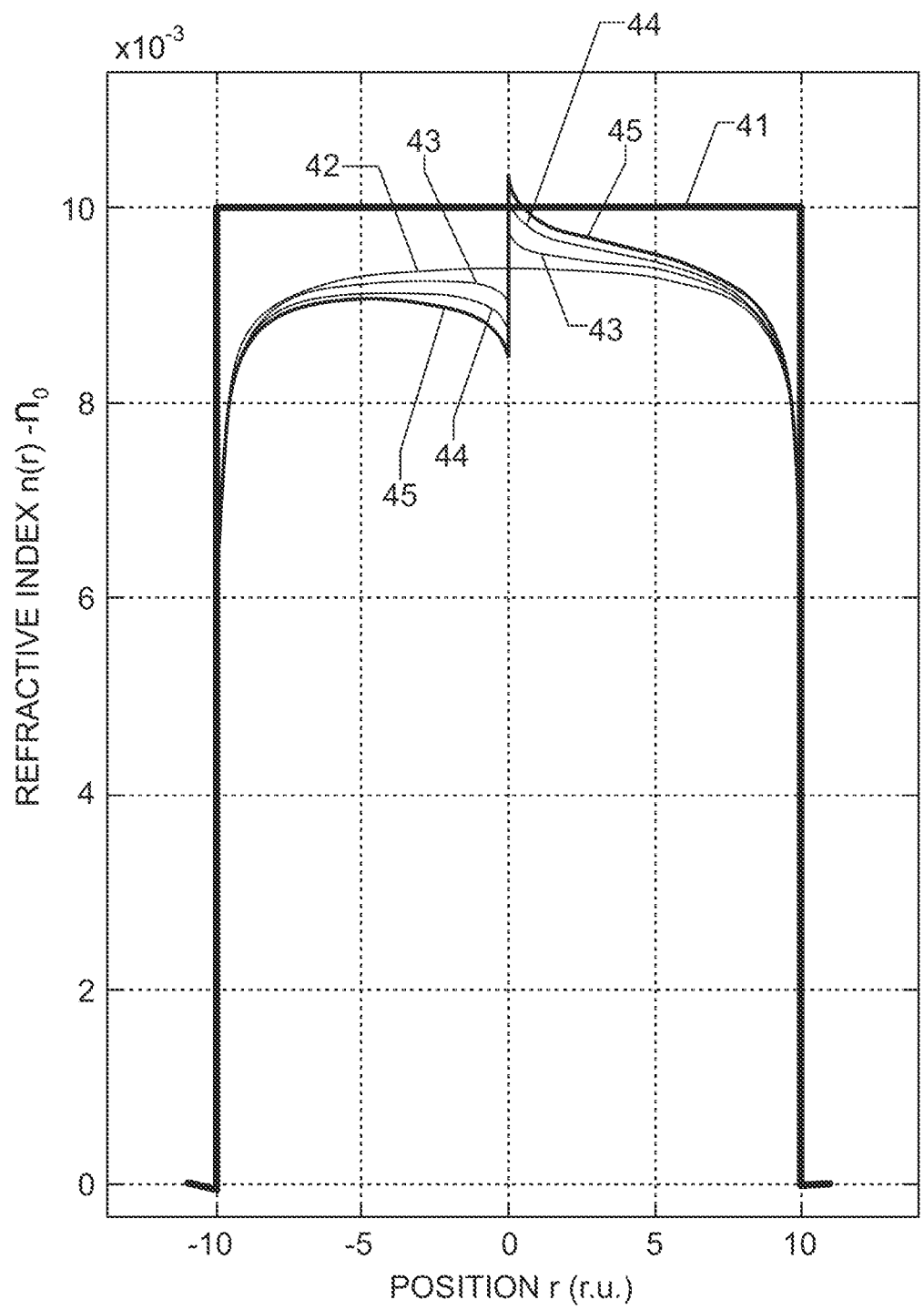
FIG. 5 shows diagrams with different refractive index distributions for illustrating the impact of an offset in the origin of the underlying deflection angle distributions.

One method to determine the origin of ψ is to fit a straight line (or odd polynomials) on a subarea of the innermost region (about 10% to 20% of the core diameter). The region needs to have a substantially homogeneous refractive index and be centered. In general, this procedure can work for tubes (because of the air core region) and homogeneous fused silica cores. (In practice, this works best for undoped cores only. Tubes are extremly dependent on geometry perfection. Doping typically causes microvariations.) Alternatively, and recommended because it is also applicable to non-homogeneous cores, the method defines ψ=0° by evaluating the calculated RIPs. In practice, a range of origins will be defined, the RIPs calculated, and based on the comparison the most reasonable RIP will be picked. The origin also can be iteratively corrected either automatically or by a skilled person by looking at the calculated RIP for each offset step. FIG. 5 illustrates miscentering. It is relatively easy to choose the best origin based on the RIP.

The outcome of the evaluation and preparation is a prepared deflection angle distribution ψ'(y) which is adapted with respect to its origin to the coordinate origin.

In a next step, a RIP called the prepared refractive index profile n'(r) is produced from the prepared deflection angle distribution ψ'(y) by transformation. The generation of a RIP from the originally measured deflection angle distribution is not required to complete this step. The previous adaptation of the origin of the deflection angle distribution is of great help to this transformation, which is conducted, for example, using an Abel transform. Without an adaptation, small deviations from the actual origin lead to errors (i.e., untrustworthy imperfections) in the transformed refractive index distribution.

The prepared refractive index profile n'(r) is still without refractive index and radius values from the non-measurable region, so that it does not reflect the RIP of the preform which is to be expected in reality. The prepared refractive index profile represents an illustrative orientation guide, however, from which suitable orientation values for a hypothetical refractive index profile n*(r), which is the basis for the subsequent method step, can be derived in a relatively unambiguous manner. The orientation values to be derived comprise an orientation value r*k for the layer radius and an orientation value n*k for the layer refractive index of the hypothetical refractive index profile n*(r). Empirical values and data stored in databases, which can also be used to determine the refractive index, often exist especially for the refractive index.

In the simplest case, the determined extreme values $y_{k,right}$ and $y_{k,left}$ are used to fix the orientation value r*k in the evaluation of the prepared refractive index profile n'(r). As explained above in connection with the approximation method, however, this is only approximately correct. In a particularly preferred method variant, the determined extreme values $y_{k,right}$ and $y_{k,left}$ are therefore converted into layer radii $r_{k,right}$ and $r_{k,left}$, respectively, and the calculated layer radii are used to fix the orientation value r*k.

The conversion of the extreme values in the layer radius is preferably completed on the basis of one of the following two equations.

$$r^*_k = n_0/n_{k-1} * y_{k,max}; \text{ or} \quad \text{Equation (2)}$$

$$r^*_k = n_0/n_k * y_{k,max}, \quad \text{(Equation 3)}$$

where $n_0$=refractive index of the surrounding medium, $n_{k-1}$=refractive index of the layer adjoining layer k on the outside, $n_k$=refractive index of layer k, and $y_{k,max}$=position of the deflection angle of layer k with the maximum absolute value. Equation (2) is applicable in cases where no total reflection takes place on the boundary at $r_k$; otherwise, Equation (3) is applicable.

The hypothetical RIP is based on the prepared refractive index profile n'(r) and the orientation values derived from this profile, which, in turn, include estimated values for the refractive index and radii from the non-measurable region. The hypothetical RIP already depicts the refractive index profile of the preform to be expected in reality, or it is close to this refractive index profile. The iteration explained in the following few paragraphs is applied to the object layer by layer.

A simulated deflection angle distribution ψ"(y) is produced from the hypothetical refractive index profile n*(r) in the next method step. The above-mentioned Equation (1) is applicable to generate the simulated deflection angle distribution ψ"(y). The simulated deflection angle distribution ψ*(y) is thus based on the assumption of a RIP of the object 20 (namely the hypothetical refractive index profile n*(r)) which in turn is derived from a prepared refractive index profile n'(r) after correction and evaluation of original measurement values. A simulated refractive index profile n"(r) is again obtained by transformation of the simulated deflection angle distribution ψ"(y).

Hence, a simulated refractive index profile n"(r) is obtained by simulation via the auxiliary construct of the hypothetical refractive index profile n*(r) from the prepared refractive index profile n'(r). The more the simulated refractive index profile n"(r) resembles the prepared refractive index profile n'(r), the closer are the assumptions underlying the hypothetical refractive index profile n*(r) to reality, i.e., the real refractive index profile n(r) of the object 20.

Ideally, if the simulated refractive index profile n"(r) and the prepared refractive index profile n'(r) are a match, the hypothetical refractive index profile n*(r) underlying the simulation would thus reflect the real refractive index profile of the object 20. In practice, however, an exact match cannot be achieved. An adequate and arbitrarily accurate adaptation can be achieved, however, by iterative fitting of the simulated refractive index profile n"(r) to the prepared refractive index profile n'(r). The iteration includes at least one run of the simulation according to the following method step: generating a simulated deflection angle distribution ψ"(y) on the basis of the hypothetical refractive index profile n*(r) with the orientation values $r^*_k$ and $n^*_k$, and transforming the deflection angle distribution into a simulated refractive index profile n"(r). The outcome is a sufficiently accurate, fitted, simulated refractive index profile $n''(r)_{fit}$ that is defined by parameters $r^*_{k,fit}$ and $n^*_{k,fit}$ which are adapted in an optimal or adequate way. Thus, the hypothetical RIP underlying this simulation with the adapted parameters $r^*_{k,fit}$ and $n^*_{k,fit}$ simultaneously represents the reconstructed, real RIP of the object 20.

As a mathematical criterion whether a sufficiently fitted, simulated refractive index profile $n^*(r)_{fit}$ has been achieved, one can calculate whether the deviation between the simulated refractive index profile n"(r) and the prepared refractive index profile n'(r) is below a given threshold value. The calculation of the deviation is preferably carried out on the basis of the least absolute residuals or on the basis of the least squares method. In the case of equidistant radii, the absolute residuals correspond to so-called best-fit areas.

Because, according to embodiments of the methods, the determination of the optimized parameters $r^*_{k,fit}$ and $n^*_{k,fit}$ as well as the determination of sufficiently adapted (fitted) profiles is based on refractive index profiles, and not on the level of deflection angle distributions, simplifications and improvements are achieved with respect to plausibility, accuracy, and reproducibility of the measurement results.

Ideally, every layer of the optical object 20 shows the given layer refractive index $n_k$ over the whole layer radius $r_k$. In reality, however, there are deviations from this ideal. The layer refractive index $n_k$ may vary around the nominal value and its evolution may differ from the constant value. The reconstruction of the RIP on the basis of the method according to the disclosed embodiments does not presuppose an ideal step profile. Deviations are leveled to a mean value of the real layer refractive index. This is equally applicable to a layer with a preset refractive index gradient.

In a particularly preferred embodiment of the methods, a fitting of the simulated deflection angle distribution ψ*(y) to the prepared deflection angle distribution ψ'(y) is completed by iterative adaptation of the parameters $r^*_k$ and $n^*_k$ (by the method step discussed above) in addition to the fitting of the simulated refractive index profile n"(r) to the prepared refractive index profile n'(r) according to the following method step: fitting the simulated refractive index profile n"(r) to the prepared refractive index profile n'(r) by iterative adaptation of the parameters $r^*_k$ and $n^*_k$, wherein a fitted, simulated refractive index profile $n^*(r)_{fit}$ is obtained which is defined by adapted parameters $r^*_{k,fit}$ and $n^*_{k,fit}$. A fitted, simulated deflection angle distribution $\psi'^*(y)_{fit}$ is obtained that is defined by adapted parameters $r'^*_{k,fit}$ and $n'^*_{k,fit}$. The RIP is obtained as the hypothetical refractive index profile with the adapted parameters $r^*_{k,fit}$ and $n^*_{k,fit}$, upon combining the fitted, simulated refractive index profile $n^*(r)_{fit}$ having a weighting factor G with the fitted, simulated deflection angle distribution $\psi'^*(y)_{fit}$ having a weighting factor (1−G), where 0<G<1.

To reconstruct the real refractive index profile n(r), weighted parameters are used that are obtained by viewing the refractive index plane from the fitted, simulated refractive index profile $n''(r)_{fit}$ on the one hand, and by viewing the angle plane due to the fitted, simulated deflection angle distribution $\psi'^*(y)_{fit}$ on the other hand. Random measurement value variations or conversion errors are thereby eliminated, whereby a higher accuracy is achieved in the reconstruction of the real refractive index profile.

The parameters determined on the basis of the reconstruction of the real refractive index profile n(r), particularly the adapted parameters $r^*_{k,fit}$ and $n^*_{k,fit}$, are preferably used for the adaptation of a preform manufacturing process.

The method according to an embodiment serves to determine a refractive index profile of a cylindrical optical object 20, such as, for instance, an optical preform. The RIP of a preform cannot be measured directly and is therefore indirectly determined as a deflection of a light beam transmitted through a volume region of the preform. The refractive index distribution of the preform can be deduced from the deflection distribution of the exiting light beams.

Figure 3:
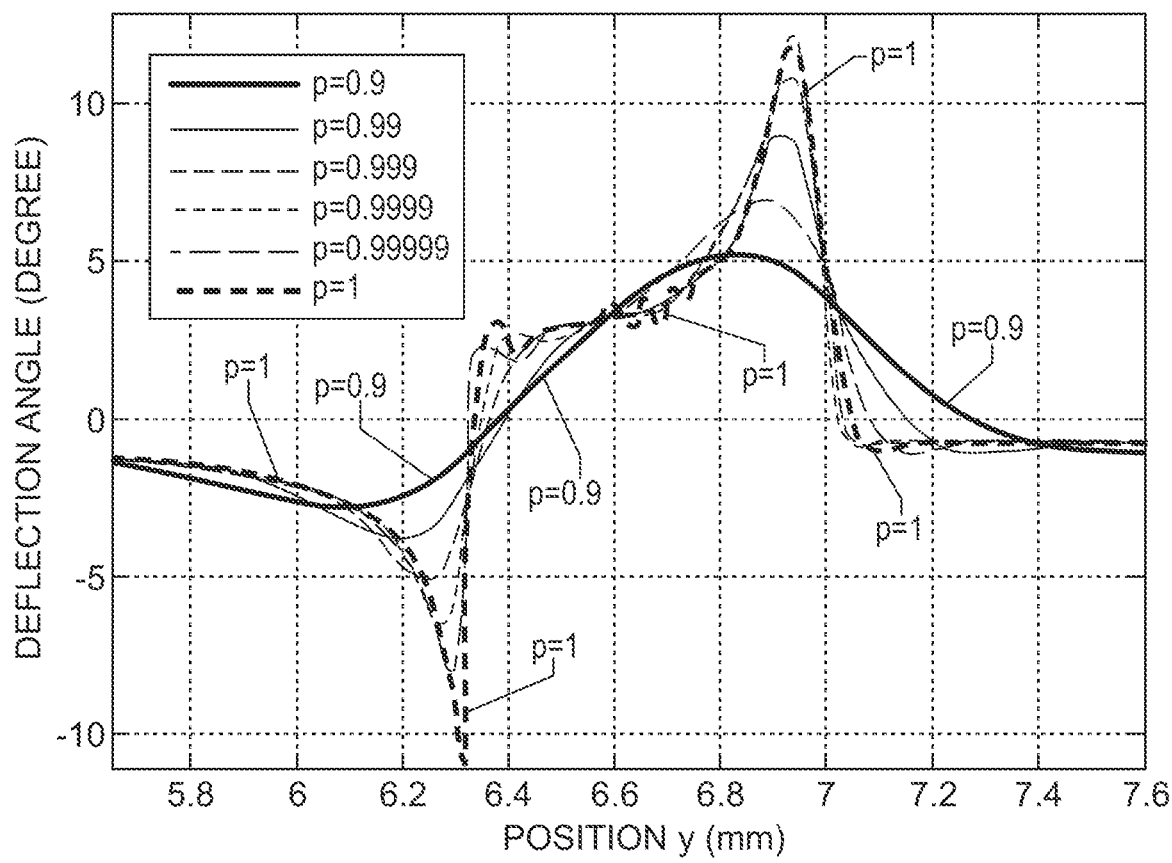
FIG. 3 shows a section of a measured deflection angle function with associated spline functions for various smoothing parameters p.

The diagram of FIG. 3 shows a section of a typical deflection angle function measured as described above, using the example of a preform in which a core rod of undoped quartz glass is surrounded by an inner cladding layer of fluorine-doped quartz glass and an outer cladding layer of undoped quartz glass. The deflection angle $\psi$ (in degrees) is plotted versus the position along the y-axis (in millimeters). The curve designated by "p=1" corresponds to the measurement curve. In the diagram, several spline functions for various smoothing parameters p<1 are also plotted. These curves demonstrate the effect of the various smoothing steps and will be explained in more detail below.

Figure 4:
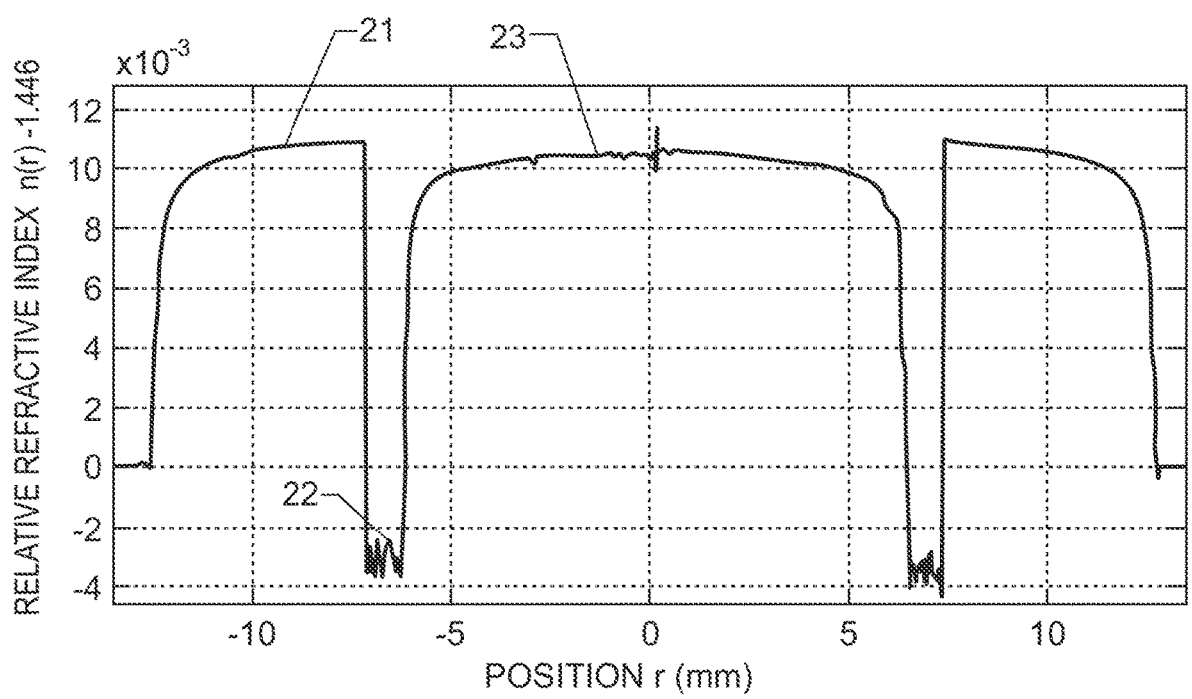
FIG. 4 shows a refractive index distribution calculated from the measured deflection angle distribution (p=1) of FIG. 3.

The calculation of the refractive index distribution n(r) from the deflection angle distribution is completed using an Abel transform. In the corresponding diagram of FIG. 4, the relative refractive index n(r)−1.446 is plotted versus the radius r (in millimeters). The curve which is only shown by way of example was calculated from the measured deflection angle distribution (p=1) of FIG. 3 by way of numerical integration. The curve in region 21 represents the core rod; the curve in region 22, the inner cladding layer; and the curve in region 23, the outer cladding layer.

Figure 1A:
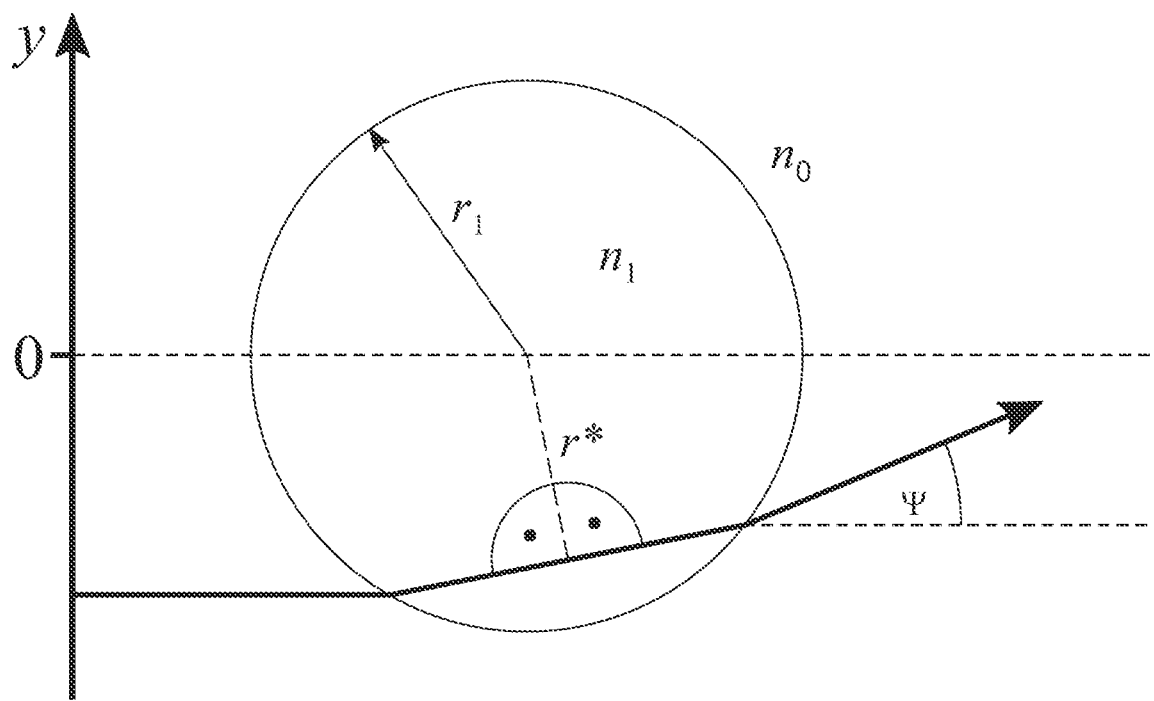
FIG. 1A shows the radiation path through an object with a homogeneous refractive index distribution illustrating various geometric relationships schematically.
Figure 1B:
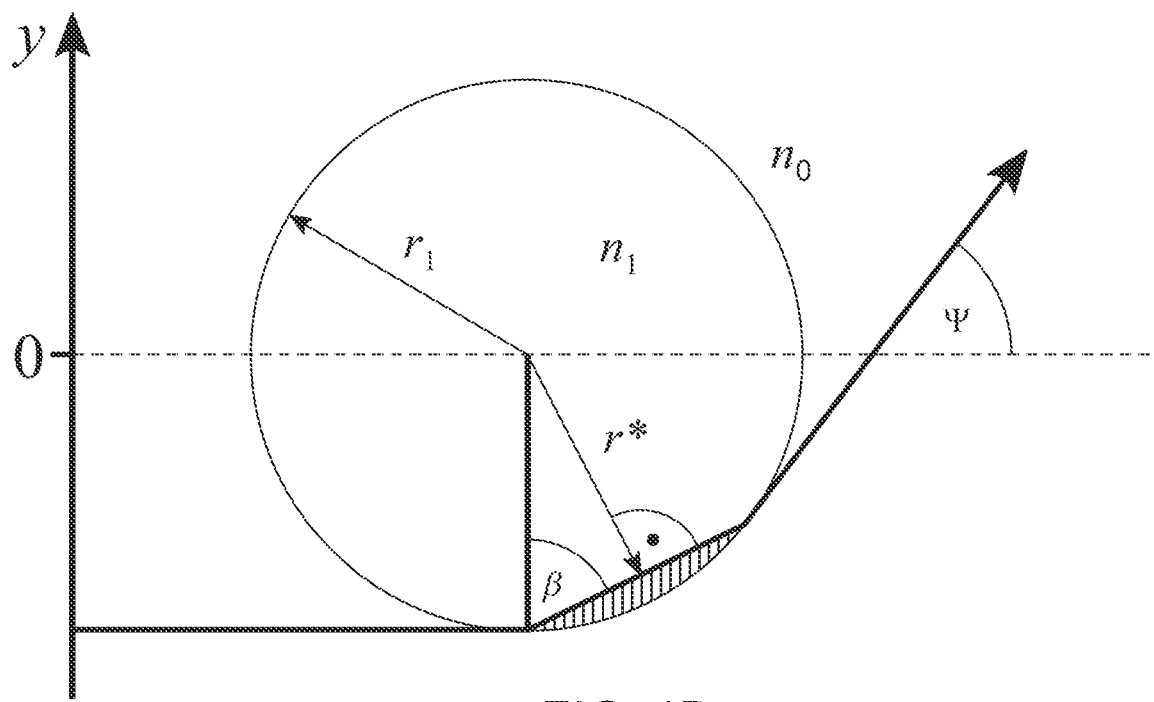
FIG. 1B shows the radiation path through an object with a homogeneous refractive index distribution illustrating the measurement artifact in refractive index profiling due to the shaded non-measurable region where no tangential radiation can be detected.

These measurement results are not correct. As explained above, one of the reasons for the error is the occurrence of a non-measurable region caused by the measuring method in the case of an upward refractive index jump, as is typical of optical fibers with a comparatively higher refractive index in the core than in the inner cladding layer. The error source is illustrated in the sketch of FIG. 1B by reference to a simple case, namely a rod with a homogeneous refractive index distribution $n_1$, which is inserted into an index adjustment fluid (also called an index adaptation liquid or an immersion liquid) with a refractive index number $n_0$, where no is less than $n_1$. During scanning of the rod, the beam which impinges tangentially at the entry point is refracted towards the center of the rod and exits again as an exit beam with a different propagation direction from the rod, resulting in a beam path as shown in FIG. 1B. Accordingly, there is an area or region in the object through which no light beam can be transmitted tangentially (i.e., that is never illuminated by the beam during measurement). This area is shown as shaded in FIG. 1B and marked at a radius r* and at an angle β (beta), with the angle β=90°−ψ/2. As a consequence, it is not possible to measure deflection angles in the region $r^*<r<r_1$, and it becomes apparent that due to this measurement error the reconstructed refractive index value is lower than the real refractive index.

A goal of the method explained below with an evaluation and modeling of the measured deflection angle distribution is a compensation of this systematic measurement error and a substantial reconstruction of the real refractive index profile n(r).

At the beginning of the evaluation, the positions of the extrema $y_{k,max}$ of the measured deflection angle distribution are determined. These are already approximately the radii of the individual layers. In principle, the exact positions on the positive and negative y-axis of the core rod edge can be determined by simple manual reading, particularly in the case of ideal data without noise.

An embodiment of the method is explained with reference to FIG. 3. The measurement data used for this embodiment correspond to curve p=1. To ensure that the edge is not erroneously placed on outlying measurement points or secondary extrema caused by noise, the measured deflection angle distribution is strongly smoothed by way of spline functions at the beginning. The spline functions are several composed higher-order polynomials, e.g., of the third order. The smoothing parameters p represent for instance a compromise among p=1 (section-wise fit of cubic polynomials), 0<p<1 (section-wise fit of a smoothed curve), and p=0 (fit of a straight line).

The method begins with p=0.9, i.e., a strong smoothing. The deflection angle increases in its absolute value over a wide region from the inside to the outside, towards an edge. The strongly smoothed deflection angle curve shows a maximum or minimum in this region, depending on the sign of the deflection angle. A few outlier data points yield small (if any) extrema. The extreme values are determined on the strongly smoothed curve. Subsequently, a smoothing with p=0.99 (less smoothing) takes place. This step is repeated for p=0.999; p=0.9999; p=0.99999; and finally, for the original measurement data (p=1), with a gradually decreasing smoothing. There is no longer any smoothing in the sixth and last iteration (p=1). It is true that the selection of p=1 corresponds to the cubic interpolation, but if it is evaluated especially at the support points, the original points are in fact obtained again. Hence, the curve p=1 represents a section of the measured data.

Therefore, the extreme values determined previously on the basis of the strong smoothing shift gradually with every iteration towards the actual extrema of the deflection angle distribution and thus tend to move also towards the real refractive index edge. The real position of the refractive index edge is thus optimally approximated by the highest smoothing parameter. The real edge position is in the case of a downward refractive index jump at the bottom of the maximum and, vice versa, in the case of an upward refractive index jump at the peak of the maximum.

The innermost extrema $y_{k,right}$ and $y_{k,left}$ of the deflection angle distribution which have been found by way of this evaluation are used in the further evaluation. They particularly serve the correction of the origin in the direction of y within the deflection angle distribution.

Before the Abel transform is completed, the origin of the deflection angle distribution ψ(y) is correctly determined. Specifically, the y-axis in the coordinate system of the angle distribution is only determined through the geometry of the measuring cell 9. Here, the center of the measuring cell 9 does not necessarily have to conform to that of the preform, which leads to a shift towards the y-axis. Moreover, the whole angle distribution may have an angle offset with a shift contribution in the ψ-direction of this coordinate system. This offset can be caused, for example, by an inaccurate referencing of the angle of a rotating disc in the measurement system 100.

FIG. 5 shows the impacts of an offset in the origin of the underlying deflection angle distributions on the refractive index distribution calculated from the underlying deflection angle distributions. To this end, two distributions consisting of 4,401 data points were made using Equation (1) and the calculations were subsequently completed. Profile Curve 41 is the assumed step profile with a refractive index jump $\Delta n = \pm 0.01$. The remaining curves show calculations of the refractive index profile, plotted as the refractive index difference $(n(r) - n_0)$ versus the position r in relative units (r.u.): Curve 42 is from a correct deflection angle distribution, Curve 43 is an incorrect positioning of the origin in the y-direction of 0.1 mm, Curve 44 is an incorrect positioning of the origin with an angle offset of $-0.02°$ (about $3.5 \times 10^{-4}$ rad), and Curve 45 is with both shifts together.

Curve 42 shows the consequences of a typical systematic error in the conversion of a measured deflection angle distribution in refractive index profiles. The total refractive index level is clearly lower than the real level. Moreover, there is a rounding off of the refractive index profile towards the edge. Curves 43 to 45 show the impacts of the incorrect positioning of the origin.

For optical preforms that are substantially radially symmetric, the previously determined core rod edges in the deflection angle distribution are particularly well suited for the determination of the preform center point and thus the coordinate origin. If necessary, the y-axis is shifted by the corresponding path, so that the origin lies exactly in the middle between the core rod edges.

The correction of the offset is conducted in order to vertically shift the deflection angle distribution accordingly. To this end, a straight line is fitted using a sum of least squares method to the middle between the innermost right extreme value $y_{k,right}$ and the innermost left extreme value $y_{k,left}$. The region to be fitted extends over not more than 20% of the core rod diameter. The measurement data are finally shifted vertically around the y-axis section of the straight line, so that the straight line runs through the origin.

In an alternative method variant for determining the offset, a higher-order polynomial (for instance 9th order) is fitted to the middle between the innermost right extreme value $y_{k,right}$ and the innermost left extreme value $y_{k,left}$. Then a sub-route between the edges or the entire route can also be chosen. In a further alternative method variant for determining the offset, the deflection angle distribution is shifted such that the sum of all equidistantly measured deflection angles is equal to zero.

The result of the evaluation and preparation is a prepared deflection angle distribution $\psi'(y)$ which is adapted with respect to its origin to the coordinate origin.

In a next step, a prepared refractive index profile $n'(r)$ is produced from the prepared deflection angle distribution $\psi'(y)$ by way of the Abel transform. As illustrated with reference to FIG. 5, the previous adaptation of the origin of the deflection angle distribution is very helpful, for without this adaptation small deviations from the actual origin would lead to errors in the transformed refractive index distribution.

It is true that the prepared refractive index profile $n'(r)$ does not reflect the refractive index profile of the preform that is really to be expected. The prepared refractive index profile $n'(r)$ represents an illustrative orientation guide, however, from which suitable orientation values for a hypothetical refractive index profile $n^*(r)$ can be derived in a relatively definite way, the hypothetical refractive index profile forming the basis for the subsequent method step. The orientation values to be derived comprise an orientation value $r^*k$ for the layer radius and an orientation value $n^*k$ for the layer refractive index of the hypothetical refractive index profile $n^*(r)$. Especially for the refractive index, there are often empirical values and data stored in databases which can be used to determine the refractive index.

In this evaluation, the previously determined extreme values $y_{k,right}$ and $y_{k,left}$ are also used to determine the orientation value $r^*k$. Because these positions correspond only approximately to the radii of the refractive index profile, however, the determined extreme values $y_{k,right}$ and $y_{k,left}$ are converted to layer radii $r_{k,right}$ and $r_{k,left}$, respectively, and the calculated layer radii are used to fix the orientation value $r^*k$. The conversion of the extreme values into the layer radii takes place on the basis of the second equation in the Abel transform when total reflection does not occur on the boundary at $r_k$ and it takes place on the basis of Equation (3) when total reflection does occur on the boundary at $r_k$.

Figure 6:
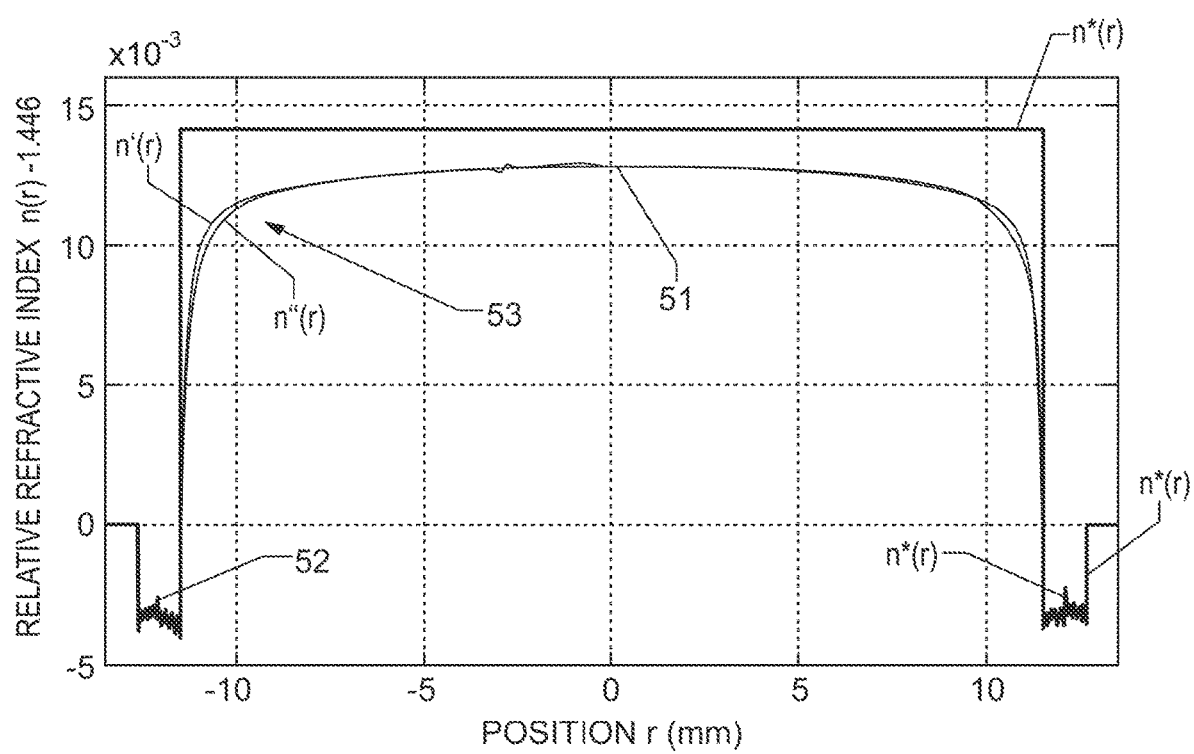
FIG. 6 shows a diagram with a prepared refractive index profile n'(r) and a hypothetical refractive index profile n*(r) modeled by evaluation of the profile for a preform with a step profile.

The diagram of FIG. 6 shows, for a preform with a simple step profile, a prepared refractive index profile $n'(r)$ and a hypothetical refractive index profile $n^*(r)$ modeled by evaluation thereof. The refractive index is indicated as a relative value based on the refractive index of the index adjustment fluid ($n_0 = 1.446$).

The hypothetical refractive index profile $n^*(r)$ already depicts the refractive index profile of the preform to be expected in reality, or it is close to the refractive index profile. The hypothetical refractive index profile is based on the prepared refractive index profile $n'(r)$ and the orientation values derived from the profile, which, in turn, include estimation values for the refractive index and the radii from the non-measurable region.

Using Equation (1), a simulated deflection angle distribution $\psi''(y)$ is produced from the hypothetical refractive index profile $n^*(r)$ in the next method step. The simulated deflection angle distribution $\psi^*(y)$ obtained thereby is thus based on the assumption of a refractive index profile of the preform (namely the hypothetical refractive index profile $n^*(r)$), which, in turn, after correction and evaluation of original measurement values, is derived from a prepared refractive index profile $n'(r)$.

A simulated refractive index profile $n''(r)$, plotted with this designation in FIG. 6, is obtained again by transforming the simulated deflection angle distribution $\psi''(y)$ on the basis of the first equation in the Abel transform. The profile has a rounded region 53 between a cladding region 52 and a core region 51. Apart from this rounded region 53, the simulated refractive index $n''(r)$ is almost congruent with the prepared refractive index profile $n'(r)$. Considering that the assumed refractive index distribution $n^*(r)$ considerably differs therefrom, this is remarkable. The similarity is a hint that the assumptions underlying the hypothetical refractive index profile $n^*(r)$ are already very close to the real refractive index profile $n(r)$ of the preform. That is, the hypothetical refractive index profile $n^*(r)$ in FIG. 6 reflects the real refractive index profile $n(r)$ accurately or at least adequately accurately.

In practice, an exact match between the simulated refractive index profile $n''(r)$ and the prepared refractive index profile $n'(r)$ cannot be achieved. It is possible to achieve an adequately and arbitrarily accurate adaptation, however, by iteratively fitting the simulated refractive index profile $n''(r)$ to the prepared refractive index profile $n'(r)$.

During iterative fitting, the parameters $r^*_k$ and $n^*_k$ are varied for such a long time that an adequately accurate, fitted, simulated refractive index profile $n''(r)_{fit}$ is obtained. The parameters $r^*_{k,fit}$ and $n^*_{k,fit}$ used therein form the basis for the corresponding hypothetical refractive index profile n*(r) and these parameters thereby represent the reconstructed, real refractive index profile of the preform at the same time.

A criterion whether an adequately fitted, simulated refractive index profile $n^*(r)_{fit}$ is present is the minimum in the deviation between the simulated refractive index profile n"(r) and the prepared refractive index profile n'(r), which is, for example, determined on the basis of the sum of the least absolute residual. Even in the case of a rather complex refractive index profile of a preform with eight layers, the measurement method yields a good result. The fitting of the layer parameter preferably takes place starting from the outer layer to the inside.

In the above-explained model for the reconstruction of the real refractive index profile of FIG. 6, simulated refractive index profiles n"(r) were fitted to the prepared refractive index profile n'(r). In a modification of this procedure for reconstruction, weighted parameters were additionally used that were obtained by considering the refractive index plane from the fitted, simulated refractive index profile $n''(r)_{fit}$, on the one hand, and by considering the angular plane due to the fitted, simulated deflection angle distribution $\psi'^*(y)_{fit}$, on the other hand. This eliminates both random measurement value variations and conversion errors, and thereby achieves a higher accuracy in the reconstruction of the real refractive index profile.

Thus, simulated deflection angle distributions $\psi^*(y)$ are additionally fitted to the prepared deflection angle distribution $\psi'(y)$. The fitting process is based on the iterative adaptation of the parameters $r^*_k$ and $n^*_k$. The parameters are varied until a sufficiently accurate, fitted, simulated deflection angle distribution $\psi''(r)_{fit}$ is obtained. The optimally adapted parameters $r'^*_{k,fit}$ and $n'^*_{k,fit}$, which are here used, form the basis for the corresponding hypothetical refractive index profile n*(r), but they may differ from the optimally adapted parameter values $r^*_{k,fit}$ and $n^*_{k,fit}$. The information gained thereby is additionally taken into account in the reconstruction of the refractive index profile by combining the fitted, simulated refractive index profile $n^*(r)_{fit}$ with a weighting G=0.5 with the fitted, simulated deflection angle distribution $\psi'^*(y)_{fit}$ (also G=0.5).

To be able to determine the refractive indices $r_k$ and $n_k$ of the individual layers more accurately, a fit using the least squares method or the method of the least absolute residuals is advisable.

An important problem is that the fit function n(r) has no analytical expression. Therefore, a detour is applied to establish the fit function. Within an iteration, the parameters $r_k$ and $n_k$ are varied each time, a deflection angle distribution is generated by Equation (1), and an Abel transformation is completed to finally compare the resulting profile n(r) by the least squares criterion or by the method of the least absolute residuals with the refractive index distribution of the measurement. The calculation of the transformation is therefore a fixed component of each iteration, which prolongs the computing time.

To ensure a fitting within a shorter period of time, the following restrictions can be made: (i) Correction of the origin (due to the origin correction, the offset in the $\psi$ direction and the shift in the y-direction, which would otherwise be independent fit parameters, are omitted and the number of independent fit parameters is thereby reduced by two); (ii) Side-wise fitting (to consider even minimal deviations within the preform with respect to the radial symmetry in the fit, various layer parameters $r_k$ and $n_k$ are allowed within a layer for the positive and negative y-axis; the fit can be separated into two fits with only half the number of free fit parameters, however, which yields a considerable reduction in the number of required iterations and thereby saves time); and (iii) Layer-wise fitting (starting from the basic idea of splitting a fit with many free parameters into several fits with a few free parameters, layer-wise fitting is also possible, apart from sidewise fitting; it must be noted, however, that the parameters $r_k$ and $n_k$ which are to be determined must be determined from the outside to the inside so that the number of the layers under consideration is thereby successively increased, and the considered region of the fit also increases layer-wise; together with the previously explained sidewise fitting, one obtains in a preform with k layers 2k fits with respectively two unknown parameters to be determined, instead of a fit with 4k, and the required computing time is thereby considerably reduced).

As summarized above, the chronology of development in refractive index profile (RIP) evaluation methods is as follows. Initially, a straight-forward Abel transformation was applied. The Abel transformation did not consider, however, the typical measurement artifact in RIP. Next, U.S. Pat. No. 8,013,985 issued to by Corning Incorporated offered an improved method, the '985 method, but for research and development (as opposed to commercial) purposes only. Finally, the applicant's own U.S. Pat. No. 10,508,973 teaches a method, the '973 method, that represents the current state-of-the-art with respect to determining the RIP when the RIP is substantially or completely step-index like. The '973 method considers the well-known measurement artifact in refractive index profiling (underrated refractive index steps and rounded profiles).

In summary, the method taught by the '973 patent determines a radial RIP of a cylindrical optical object which has a cylinder longitudinal axis around which at least one layer k with a layer radius $r_k$ and with a layer refractive index $n_k$ extends radially symmetrically. The method includes the steps of measuring a deflection angle distribution $\psi(y)$ by directing an entry beam at an entry point into the cylindrical optical object in a direction transverse to the cylinder longitudinal axis, wherein the deflection angle $\psi$ is defined as the angle between an exit beam relative to the entry beam, and y is the distance between the cylinder longitudinal axis and the entry point of the entry beam in a Cartesian coordinate system; and reconstructing the RIP therefrom on the basis of a model. The model includes the following measures: (a) adjusting the measured deflection angle distribution $\psi(y)$, including an extreme value determination of the deflection angle distribution and including regions of a refractive index step, wherein an adjusted deflection angle distribution $\psi'(y)$ is obtained and wherein the adjusting of the measured deflection angle distribution comprises a correction in which the origin of the deflection angle distribution is adjusted, (b) transforming the adjusted deflection angle distribution $\psi'(y)$ into an adjusted refractive index profile n'(r), (c) evaluating the adjusted refractive index profile n'(r) for fixation of orientation values, the orientation values comprising an orientation value $r^*_k$ for the layer radius and an orientation value $n^*_k$ for the layer refractive index of a hypothetical refractive index profile n*(r), (d) creating a simulated refractive index profile n"(r) by generating a simulated deflection angle distribution $\psi''(y)$ on the basis of the hypothetical refractive index profile n*(r) with the orientation values $r^*_k$ and $n^*_k$, and transforming the deflection angle distribution into the simulated refractive index profile n"(r), (e) fitting the simulated refractive index profile n"(r) to the adjusted refractive index profile n'(r) by iterative adaptation of the orientation values $r^*_k$ and $n^*_k$, wherein a fitted, simulated refractive index profile $n^*(r)_{fit}$ is obtained which is defined by adapted parameters $r^*_{k,fit}$ and $n^*_{k,fit}$, and (f) obtaining the refractive index profile as the hypothetical refractive index profile with the adapted parameters $r^*_{k,fit}$ and $n^*_{k,fit}$.

Both the '985 method and the '973 method are suitable only for step-index or at least substantially step-index preforms. A step-index preform is defined as a preform that creates a multimode or single mode optical fiber with a uniform refractive index throughout the core. (There are also step-like multi-cladding fibers, where in addition to transmitting within the core, additional light is transmitted in a cladding layer as multimode.) The step is the shift between the core and the cladding, which has a lower refractive index than the core. The term "substantially," as used in this document, is a descriptive term that denotes approximation and means "considerable in extent" or "largely but not wholly that which is specified" and is intended to avoid a strict numerical boundary to the specified parameter. Thus, a substantially step-index preform is a preform that creates a multimode or single mode optical fiber having a core with a refractive index that is largely if not wholly uniform.

Neither the '985 method nor the '973 method, or any other known method for that matter, accurately provides a RIP for an object that is not fully step-index like but requires a compensation of the previous described measurement artifact in refractive index profiling. The '985 method takes a measured deflection function ψ(y) and fits an ideal refractive index deflection curve to the measured deflection function. Thus, the calculation is completed in the deflection function space. In contrast, the '973 method completes calculations in the refraction index profile space.

The remainder of this document describes the steps of an improved method that provides an accurate RIP for an object that does not have a step-index or at least a substantially step-index. The improved method considers the well-known measurement artifact in refractive index profiling (underrated refractive index steps and rounded profiles). The object 20 may have one, two, or up to ten layers to compensate according to the measurement artifact in refractive index profiling.

Figure 7:
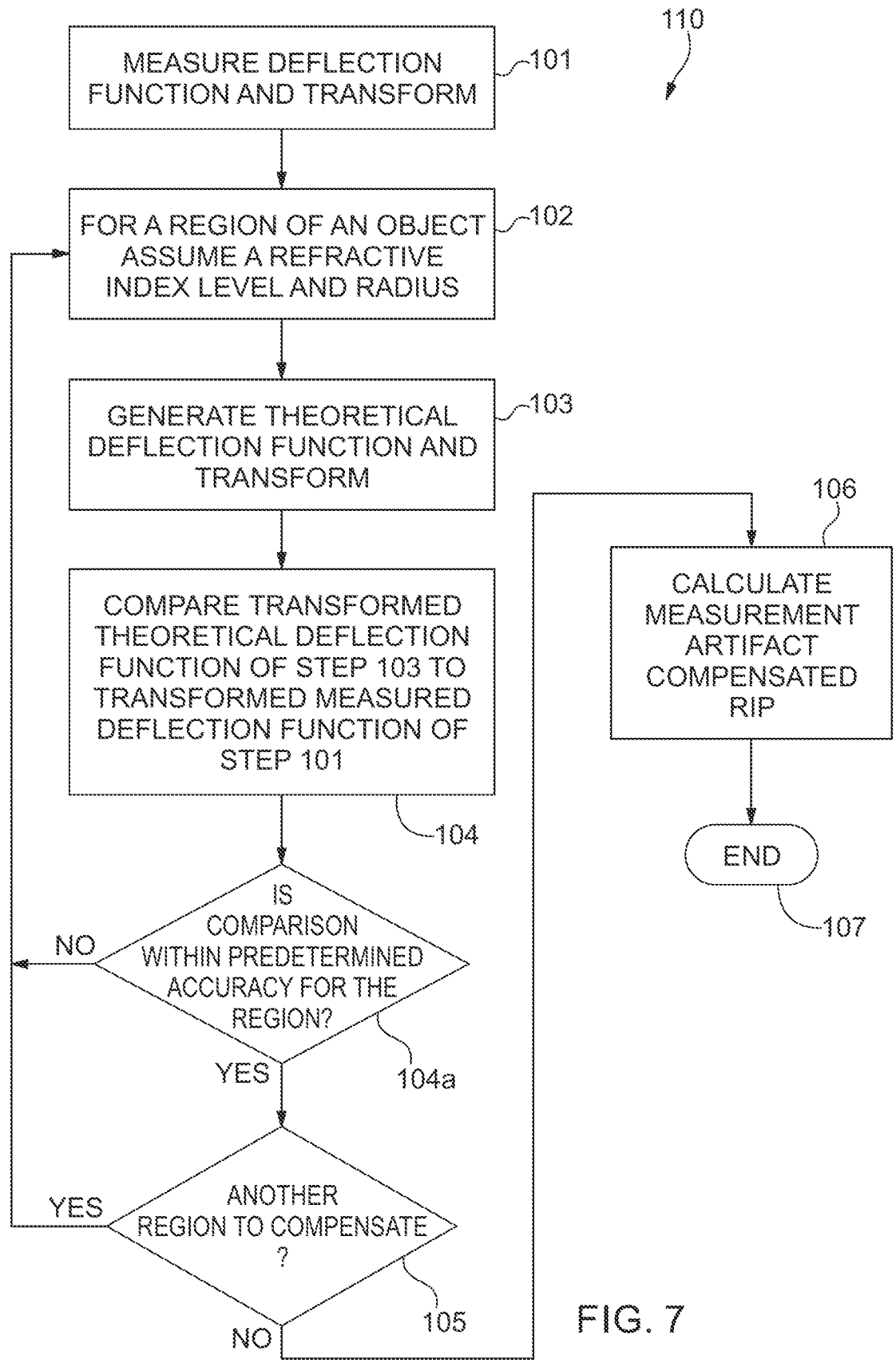
FIG. 7 is a flow diagram illustrating the steps of an improved method that provides an accurate refractive index profile for an object that does not have a step-index or at least a substantially step-index.

The steps of the improved method 110 are illustrated in the flow diagram of FIG. 7. The method 110 determines a radial RIP of the cylindrical optical object 20 having a cylinder longitudinal axis around which at least one layer k with a layer radius $r_k$ and with a layer refractive index $n_k$ extends radially symmetrically. In Step 101 of the method 110, the deflection function is measured and the measured data are transformed, using the Abel transform, into a refractive index-profile. (That RIP is reflected in the curves 201, 301 labeled "measured profile" in the examples below.) As discussed above, the step 101 typically includes measuring the deflection angle distribution ψ(y) by directing an entry beam at an entry point into the cylindrical optical object 20 in a direction transverse to the cylinder longitudinal axis, wherein the deflection angle ψ is defined as the angle between an exit beam relative to the entry beam, and y is the distance between the cylinder longitudinal axis and the entry point of the entry beam in the Cartesian coordinate system.

In Step 102 of the method 110, a refractive index level is assumed for the outer region (or layer) of the object 20. (The consequent RIP is reflected in the curves 202, 302 labeled "compensation level" in the examples below.) In Step 103, a corresponding theoretical deflection function is generated and transformed using the Abel transform. (The consequent RIP is reflected in the curves 203, 303 labeled "fitting curve" in the examples below.) In Step 104, the transformed theoretical deflection function generated in Step 103 is compared to the transformed measured deflection function of Step 101. In Step 104a, the comparison is evaluated against a predetermined accuracy level for the region of the object 20 being evaluated. By "predetermined" is meant determined beforehand, so that the predetermined characteristic must be determined, i.e., chosen or at least known, before the method steps begin. The predetermined accuracy level may depend upon the particular application. A typical predetermined accuracy is about 90%, a further predetermined accuracy is about 92%, a preferred predetermined accuracy is about 95%, a more preferred predetermined accuracy is about 97%, and a most preferred predetermined accuracy is about 99% or more.

If the transformed theoretical deflection function generated in Step 103 is determined to be sufficiently close to the transformed measured deflection function of Step 101 (i.e., the accuracy level is at or above the predetermined level), then the method 110 proceeds to Step 105. (In the examples below, the fitting curves 203, 303 will substantially match the measured profile curves 201, 301.) If not, then the method 110 returns to Step 102. Steps 102 and 103 are repeated iteratively until the accuracy level is at or above the predetermined level and the method 110 can proceed to Step 105.

In Step 105 of the method 110, a determination is made about whether the object 20 has another region (or layer) to compensate. Typically, a region of the object 20 is defined as the area or layer between a boundary or edge of the object and a refractive index discontinuity or between two refractive index discontinuities. The compensation always begins at the outer edge of the object 20 and progress inward toward the center of the object 20 in a series of one or more regions or layers. When the determination is made that no regions of the object 20 remain to be evaluated and compensated, then the method 110 proceeds to Step 106. If another region of the object 20 remains to be evaluated and compensated, then the method 110 returns to Step 102 and Steps 102, 103, 104, 104a, and 105 are repeated for each additional region until there are no more regions that remain to be evaluated and compensated.

The difference between the RIP assumed in Step 102 (the compensation level curves 202, 302 in the examples below) and the RIP corresponding to the transformed theoretical deflection function generated in Step 103 (the fitting curves 203, 303 in the examples below) is the error, shift, or offset due to the measurement artifact of refractive index profiling. This error accumulates as more layers are compensated. In Step 106 of the method 110, this difference is added to the measured and transformed RIP of Step 101 (the measured profile curves 201, 301 in the examples below) to calculate a measurement artifact compensated RIP (the curves 204, 304 labeled "new evaluation method" in the examples below). Therefore, the mathematical calculation rule is: new evaluation method curve=measured profile curve+compensation level curve−fitting curve. The measurement artifact compensated RIP curve 204, 304 includes the real absolute refractive index values. The improved method 110 provides an accurate and reliable RIP even for objects 20 that are not step-index like or substantially step-index like.

EXAMPLES

The following two examples are included to more clearly demonstrate the overall nature of the disclosure. These two examples are exemplary, not restrictive, of the disclosure.

Figure 8:
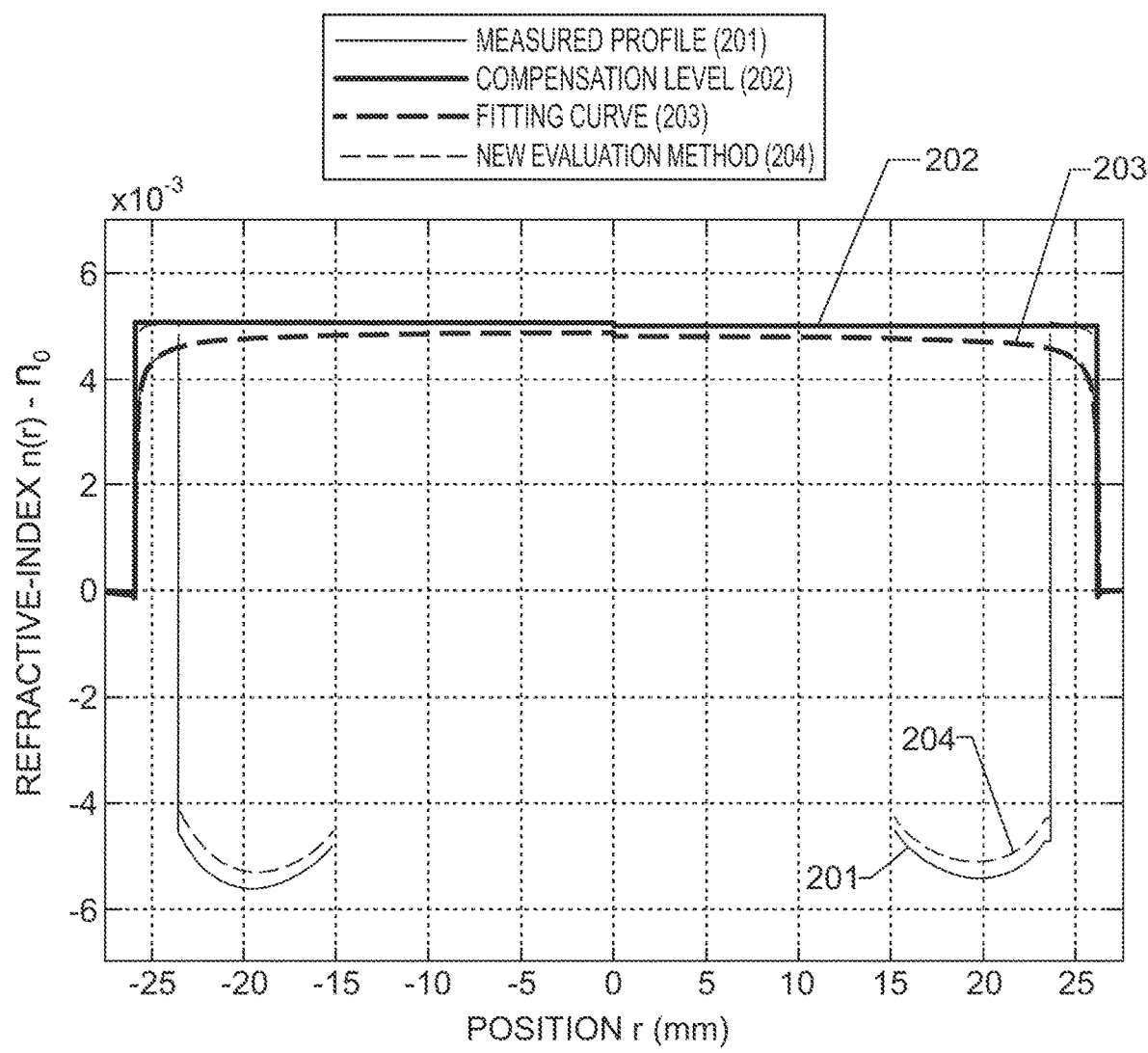
FIG. 8 is a graph of curves showing calculations of the refractive index profile, plotted as the refractive index difference $(n(r) - n_0)$ versus the position r in millimeters, to explain the application of an embodiment of the method used to calculate a measurement artifact compensated refractive index profile for an actual fluorine-doped quartz glass tube.

FIG. 8 is a graph of curves showing calculations of the refractive index profile, plotted as the refractive index difference $(n(r)-n_0)$ versus the position r in millimeters, to explain the application of the method 110 to an actual fluorine-doped quartz glass tube. As mentioned above, such a tube is often used to form the inner cladding layer that surrounds a core rod of undoped quartz glass in a preform. Depicted in FIG. 8 are the measured profile curve 201, the compensation level curve 202, the fitting curve 203, and the new evaluation method curve 204. The new evaluation method curve 204 is the final result of applying the method 110 to the tube and represents the measurement artifact compensated RIP for the tube.

Figure 9:
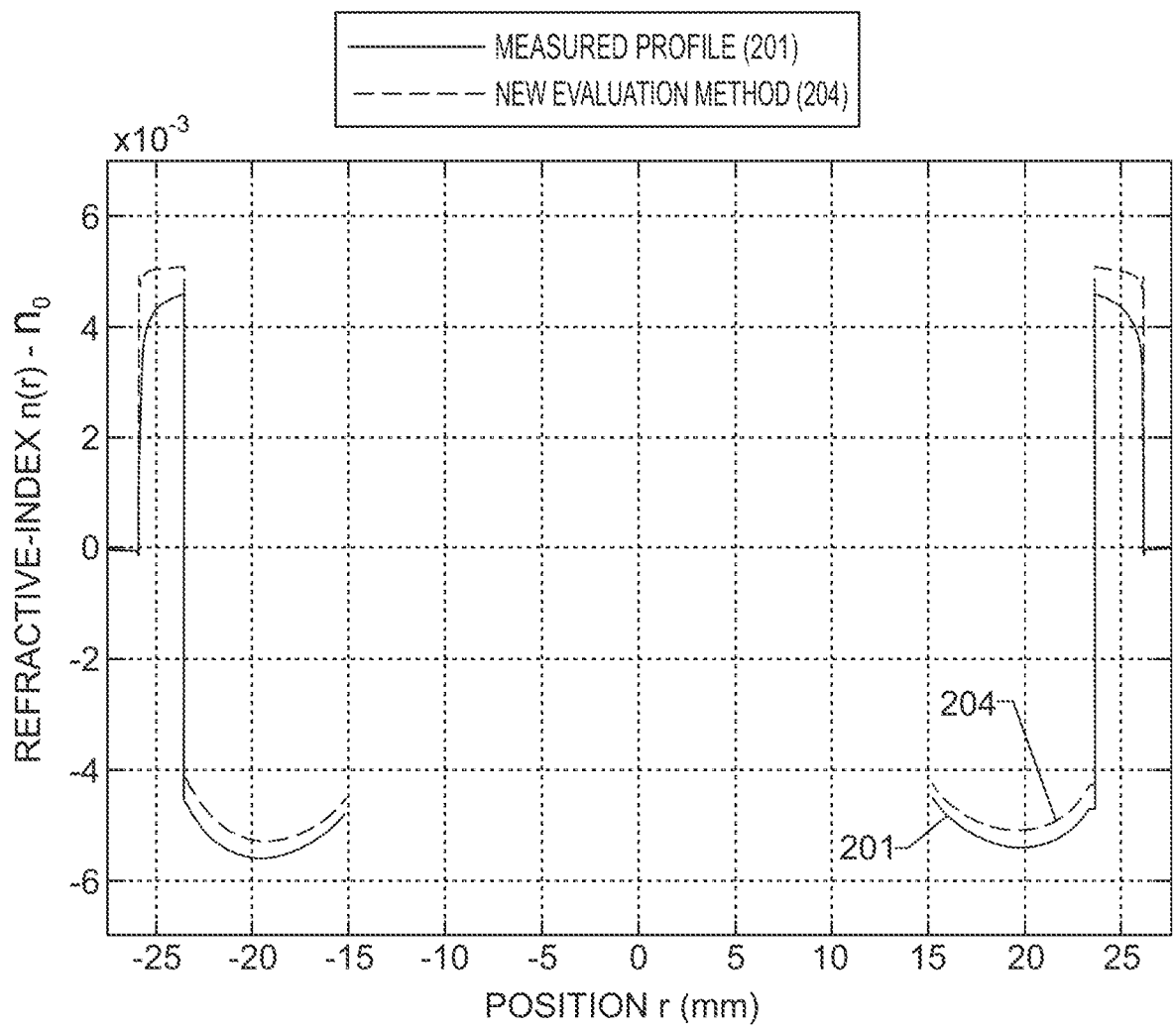
FIG. 9 is a comparison between the measured profile curve and the new evaluation method curve for the fluorine-doped quartz glass tube as shown in FIG. 8.

FIG. 9 is a simple comparison between the measured profile curve 201 and the new evaluation method curve 204 for the fluorine-doped quartz glass tube. Note that there is an important offset between these curves, which cannot be neglected, but the characteristics of the trend are still conserved. The comparison shows a high degree of correlation between the two curves, reflecting the high accuracy level achieved by the method 110.

Figure 10:
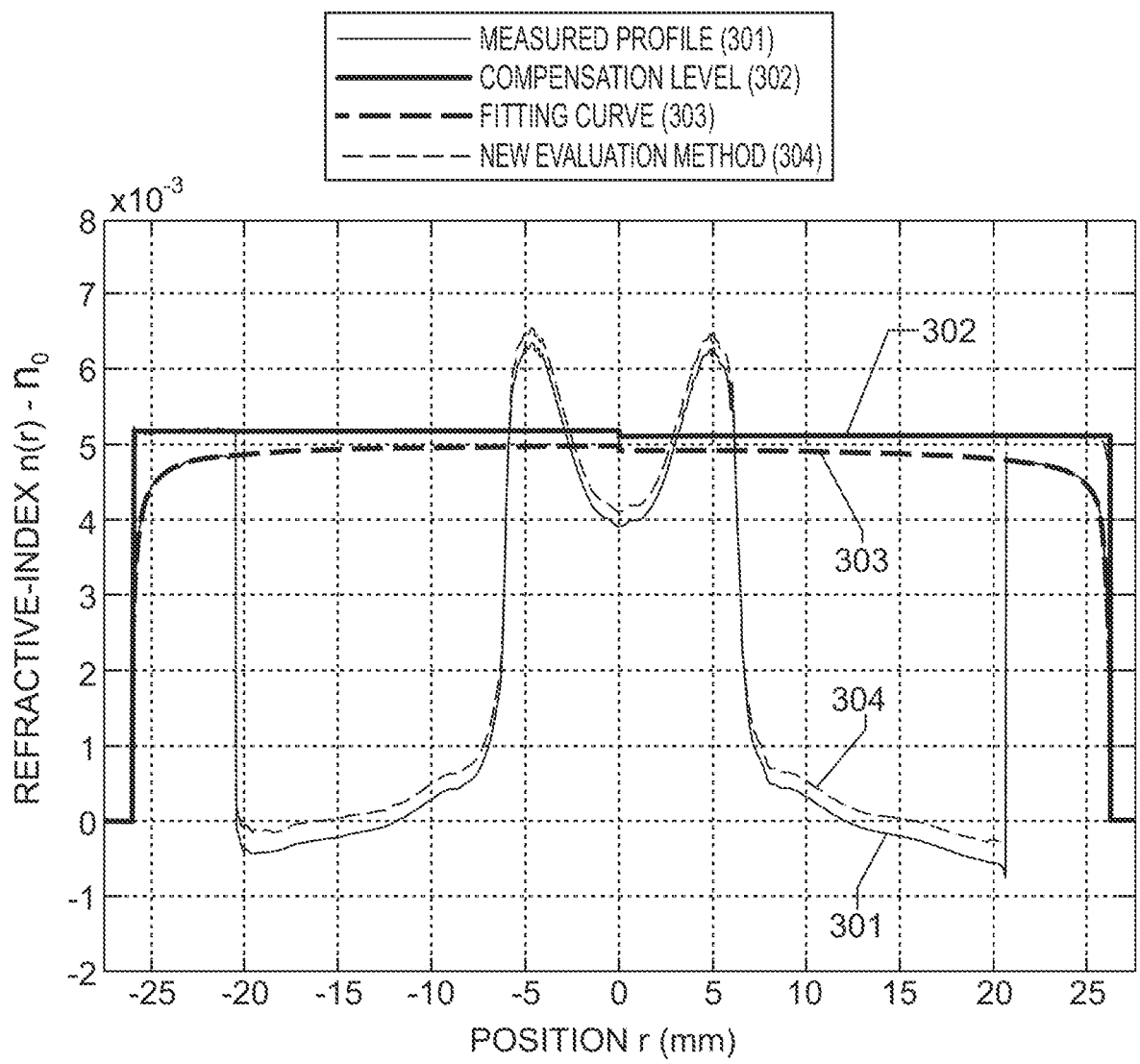
FIG. 10 is a graph of curves showing calculations of the refractive index profile, plotted as the refractive index difference $(n(r) - n_0)$ versus the position r in millimeters, to explain the application of an embodiment of the method used to calculate a measurement artifact compensated refractive index profile for an actual core rod without a step-like RIP.

FIG. 10 is a graph of curves showing calculations of the refractive index profile, plotted as the refractive index difference $(n(r)-n_0)$ versus the position r in millimeters, to explain the application of the method 110 to an actual core rod. As mentioned above, such a core rod is often surrounded by an inner cladding layer of fluorine-doped quartz glass and an outer cladding layer of undoped quartz glass in a preform. Depicted in FIG. 10 are the measured profile curve 301, the compensation level curve 302, the fitting curve 303, and the new evaluation method curve 304. The new evaluation method curve 304 is the final result of applying the method 110 to the core rod and represents the measurement artifact compensated RIP for the core rod.

Figure 11:
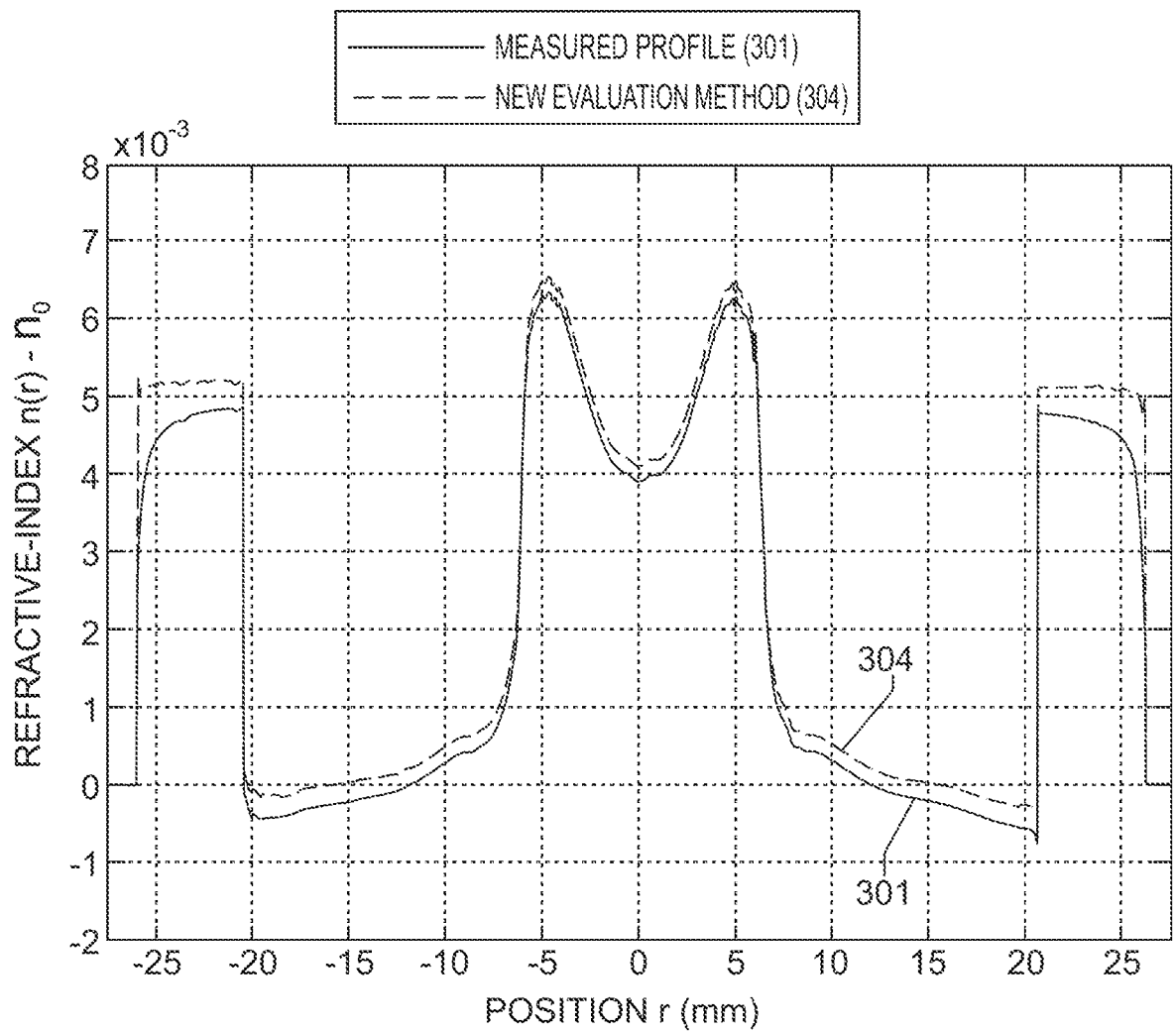
FIG. 11 is a comparison between the measured profile curve and the new evaluation method curve for the core rod as shown in FIG. 10.

FIG. 11 is a simple comparison between the measured profile curve 301 and the new evaluation method curve 304 for the core rod. The comparison shows a high degree of correlation between the two curves, reflecting the high accuracy level achieved by the method 110.

The method 110 provides RIP evaluations that are more accurate and reliable than prior methods. Such evaluations are necessary for preform assembly and to meet the demands of preform customers, especially for preforms of more complex designs. Whenever the RIP is not step-index like or substantially step-index like, such that the RIP-measurement artifact exists, the method 110 offers improved results.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

What is claimed:

1. A method for determining a radial refractive index profile of an object, the method comprising:
   (a) providing the object, the object including a cylindrical optical object which has a cylinder longitudinal axis around which at least one layer k with a layer radius $r_k$ and with a layer refractive index $n_k$ extends radially symmetrically wherein the at least one layer is not step-index nor substantially step-index;
   (b) measuring the deflection function of the object and transforming the measured data into a measured refractive index profile;
   (c) assuming a refractive index level and radius for the layer of the object being evaluated and calculating a compensation level refractive index profile;
   (d) generating a theoretical deflection function corresponding to the assumed refractive index level and radius and transforming the generated data into a fitting refractive index profile;
   (e) comparing the fitting refractive index profile to the measured refractive index profile and evaluating the comparison against a predetermined accuracy level for the layer of the object being evaluated;
   (f) repeating steps (c) and (d) iteratively until the predetermined accuracy level has been achieved;
   (g) determining whether the object has another layer to evaluate and compensate;
   (h) repeating steps (c) through (f) for each layer of the object until no further layers of the object remain to be evaluated and compensated; and
   (i) calculating a measurement artifact compensated refractive index profile for the object by adding the measured refractive index profile to the compensation level refractive index profile and subtracting the fitting refractive index profile.

2. The method according to claim 1, wherein the step (b) of measuring the deflection function includes measuring a deflection angle distribution $\psi(y)$ by directing an entry beam at an entry point into the cylindrical optical object in a direction transverse to the cylinder longitudinal axis, wherein the deflection angle $\psi$ is defined as the angle between an exit beam relative to the entry beam, and y is the distance between the cylinder longitudinal axis and the entry point of the entry beam in a Cartesian coordinate system.

3. The method according to claim 1, wherein the transforming steps are carried out on the basis of Abel transformations.

4. The method according to claim 1, wherein the predetermined accuracy level is about 99% or more.

5. The method according to claim 1, wherein the at least one layer includes an outer layer and at least one inner layer, and the outer layer is the first layer to be evaluated in step (c).

6. The method according to claim 1, wherein, in the step of determining whether the object has another layer to evaluate and compensate, a layer is the layer between a boundary or edge of the object and a refractive index discontinuity or between two refractive index discontinuities.

7. The method according to claim 1, wherein the object provided in step (a) is a fiber preform.

8. The method according to claim 1, further comprising the step of using the measurement artifact compensated refractive index profile for the adaptation of a preform manufacturing process.

9. A method for determining a radial refractive index profile of an object, the method comprising:
   (a) providing the object, the object including a cylindrical optical object which has a cylinder longitudinal axis around which at least one layer k with a layer radius $r_k$ and with a layer refractive index $n_k$ extends radially symmetrically wherein the at least one layer is not step-index nor substantially step-index;
   (b) measuring the deflection function of the object and transforming the measured data into a measured refractive index profile via Abel transformation;
   (c) assuming a refractive index level and radius for the layer of the object being evaluated and calculating a compensation level refractive index profile;

(d) generating a theoretical deflection function corresponding to the assumed refractive index level and radius and transforming the generated data into a fitting refractive index profile via Abel transformation;
(e) comparing the fitting refractive index profile to the measured refractive index profile and evaluating the comparison against a predetermined accuracy level for the layer of the object being evaluated, wherein the predetermined accuracy level is about 90% or more;
(f) repeating steps (c) and (d) iteratively until the predetermined accuracy level has been achieved;
(g) determining whether the object has another layer to evaluate and compensate, wherein a layer is the layer between a boundary or edge of the object and a refractive index discontinuity or between two refractive index discontinuities;
(h) repeating steps (c) through (f) for each layer of the object until no further layers of the object remain to be evaluated and compensated; and
(i) calculating a measurement artifact compensated refractive index profile for the object by adding the measured refractive index profile to the compensation level refractive index profile and subtracting the fitting refractive index profile.

10. The method according to claim 9, wherein the step (b) of measuring the deflection function includes measuring a deflection angle distribution $\psi(y)$ by directing an entry beam at an entry point into the cylindrical optical object in a direction transverse to the cylinder longitudinal axis, wherein the deflection angle $\psi$ is defined as the angle between an exit beam relative to the entry beam, and y is the distance between the cylinder longitudinal axis and the entry point of the entry beam in a Cartesian coordinate system.

11. The method according to claim 9, wherein the at least one layer includes an outer layer and at least one inner layer, and the outer layer is the first layer to be evaluated in step (c).

12. The method according to claim 9, wherein the object provided in step (a) is a fiber preform.

13. The method according to claim 9, further comprising the step of using the measurement artifact compensated refractive index profile for the adaptation of a preform manufacturing process.

14. A method for determining a radial refractive index profile of a cylindrical optical fiber preform, the method comprising:
(a) providing the preform, the preform having a cylinder longitudinal axis around which at least one layer k with a layer radius $r_k$ and with a layer refractive index $n_k$ extends radially symmetrically wherein the at least one layer is not step-index nor substantially step-index;
(b) measuring the deflection function of the preform and transforming the measured data into a measured refractive index profile via an Abel transformation, wherein the deflection function is derived by measuring a deflection angle distribution $\psi(y)$ by directing an entry beam at an entry point into the preform in a direction transverse to the cylinder longitudinal axis, wherein the deflection angle $\psi$ is defined as the angle between an exit beam relative to the entry beam, and y is the distance between the cylinder longitudinal axis and the entry point of the entry beam in a Cartesian coordinate system;
(c) assuming a refractive index level and radius for the layer of the preform being evaluated and calculating a compensation level refractive index profile, wherein the at least one layer includes an outer layer and at least one inner layer, and the outer layer is the first layer to be evaluated;
(d) generating a theoretical deflection function corresponding to the assumed refractive index level and radius and transforming the generated data into a fitting refractive index profile via an Abel transformation;
(e) comparing the fitting refractive index profile to the measured refractive index profile and evaluating the comparison against a predetermined accuracy level for the layer of the preform being evaluated, wherein the predetermined accuracy level is about 90% or more;
(f) repeating steps (c) and (d) iteratively until the predetermined accuracy level has been achieved;
(g) determining whether the preform has another layer to evaluate and compensate, wherein a layer is the layer between a boundary or edge of the preform and a refractive index discontinuity or between two refractive index discontinuities;
(h) repeating steps (c) through (f) for each layer of the preform until no further layers of the preform remain to be evaluated and compensated;
(i) calculating a measurement artifact compensated refractive index profile for the preform by adding the measured refractive index profile to the compensation level refractive index profile and subtracting the fitting refractive index profile; and
(j) using the measurement artifact compensated refractive index profile to adapt a preform manufacturing process.

\* \* \* \* \*